United States Patent [19]
Kusunoki

[11] Patent Number: 5,754,638
[45] Date of Patent: May 19, 1998

[54] MULTI-CALL SIMULTANEOUS TRANSFER SYSTEM AND SWITCHBOARD

[75] Inventor: Masashi Kusunoki, Kawasaki, Japan

[73] Assignee: Fujitsu Limited, Kanagawa, Japan

[21] Appl. No.: 602,635

[22] Filed: Feb. 16, 1996

[30] Foreign Application Priority Data

May 24, 1995 [JP] Japan .................................. 7-124887

[51] Int. Cl.$^6$ ............................. H04M 3/42; H04M 3/58
[52] U.S. Cl. ............................. 379/212; 379/93.14
[58] Field of Search ........................... 379/210, 211, 379/212, 201, 93.09, 93.14; 370/524

[56] References Cited

U.S. PATENT DOCUMENTS

| 4,958,153 | 9/1990 | Murata et al. | 379/94 |
| 5,408,527 | 4/1995 | Tsutsu | 379/211 |

FOREIGN PATENT DOCUMENTS 5122369  5/1993  Japan .

*Primary Examiner*—Ahmad F. Matar
*Attorney, Agent, or Firm*—Helfgott & Karas, P.C.

[57] ABSTRACT

A switching service control unit of a switchboard, when a first terminal performing a multi-call communication based on a plurality of media with a second terminal makes a request of transferring the communication call to a third terminal, discriminates a media attribute used for the multi-call communication conducted by the first terminal with reference to connection data held by a memory. The switching service control unit discriminates whether or not the third terminal is capable of controlling this media characteristic with reference to the terminal attribute held by the memory. The switching service control unit, when discriminating that the third terminal is capable of controlling that media attribute, transfers the multi-call communication conducted by the first terminal to the third terminal.

10 Claims, 23 Drawing Sheets

FIG. 10
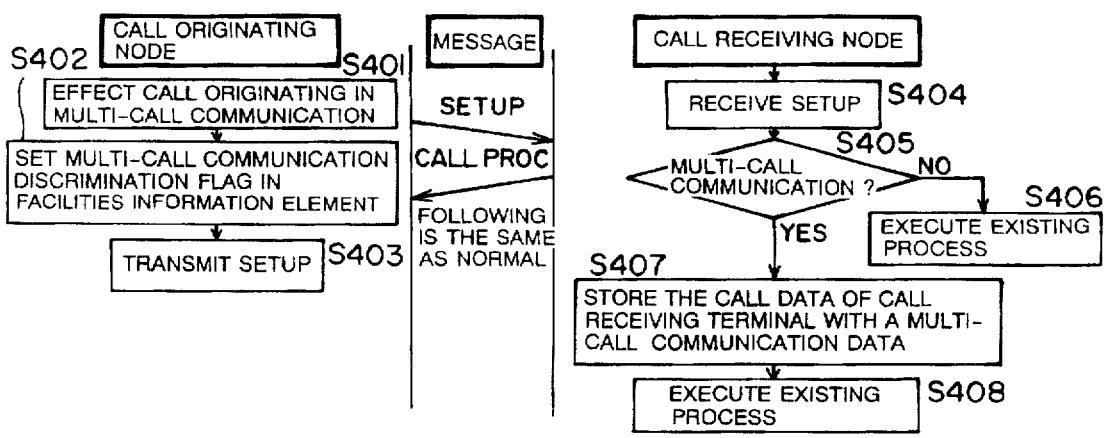
(a)
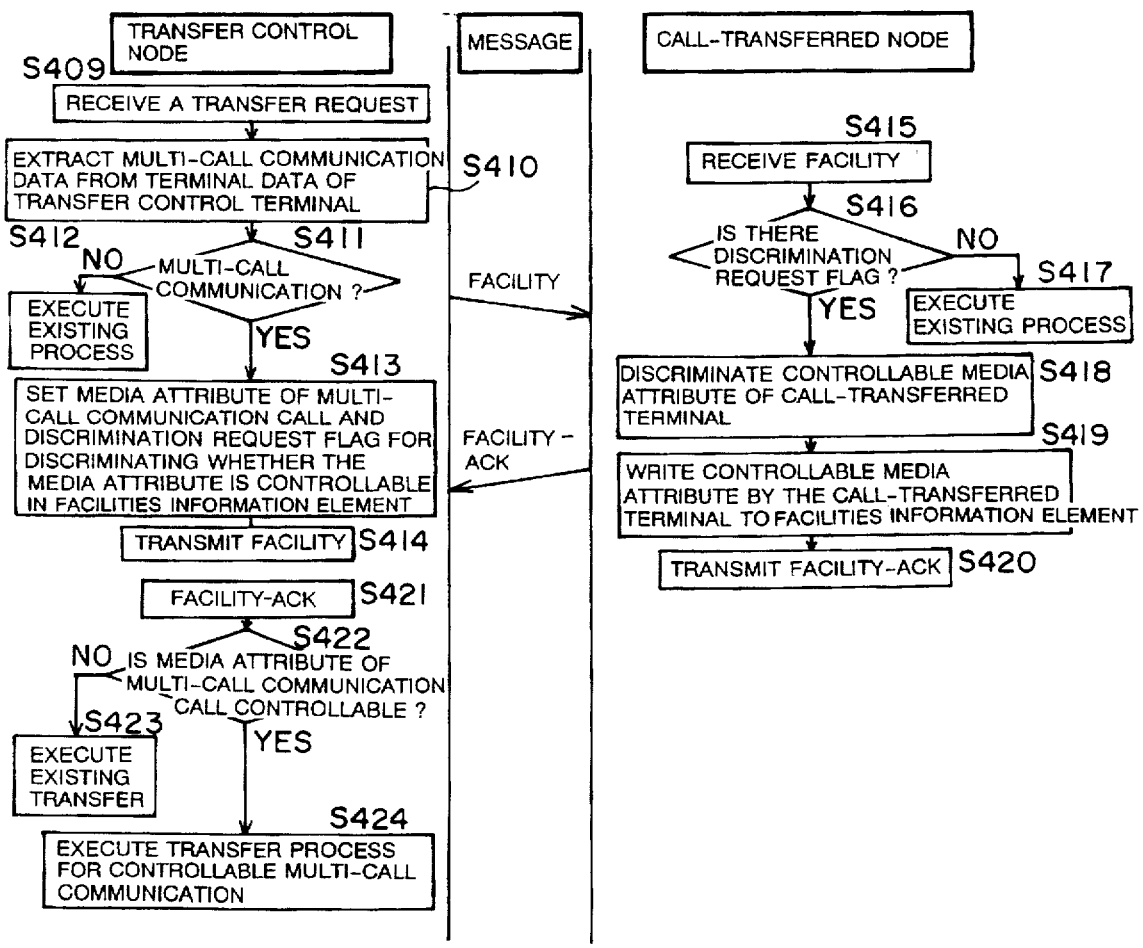
(b)

FIG. 11

| 141a → | 0 | 0 | 0 | 1 | 1 | 1 | 0 | 0 |
|---|---|---|---|---|---|---|---|---|
| 141b → | x | x | x | x | x | x | x | x |
| | 0 | 0 | 0 | 0 | 0 | 0 | 0 | 1 |
| 141c → | x | x | x | x | x | x | x | x |
| 141d → | x | x | x | x | x | x | x | x |
| 141e → | 1 | 0 | 0 | 0 | 0 | 1 | 0 | 0 |

FIG. 12

| | | | | | | | |
|---|---|---|---|---|---|---|---|
| 151a → | 0 | 0 | 0 | 0 | 0 | 1 | 0 | 1 |

| | | | | | | | | |
|---|---|---|---|---|---|---|---|---|
| 151b → | 0 | 0 | 0 | 0 | 0 | 0 | 0 | 1 |
| | x | x | x | x | x | x | x | x |
| | x | x | x | x | x | x | x | x |
| 151c → | 0 | 0 | 0 | 0 | 0 | 0 | 0 | 0 |
| | 0 | 1 | 1 | 0 | 0 | 0 | 1 | 0 |
| 151d → | 0 | 0 | 0 | 1 | 1 | 1 | 0 | 0 |
| 151e → | x | x | x | x | x | x | x | x |
| | 0 | 0 | 0 | 0 | 0 | 0 | 0 | 1 |
| 151f → | x | x | x | x | x | x | x | x |
| 151g → | x | x | x | x | x | x | x | x |
| | 1 | 0 | 0 | 0 | 0 | 0 | 0 | 1 |
| 151h → | 0 | 0 | 0 | 0 | 0 | 0 | 0 | 1 |
| | 0 | 0 | 0 | 0 | 0 | 0 | 0 | 1 |
| 151i → | 0 | 0 | 0 | 0 | 0 | 0 | 1 | 0 |

FIG. 13

| | | | | | | | |
|---|---|---|---|---|---|---|---|
| 0 | 0 | 0 | 0 | 0 | 1 | 0 | 1 |
| 0 | 0 | 0 | 0 | 0 | 0 | 0 | 1 |
| x | x | x | x | x | x | x | x |
| x | x | x | x | x | x | x | x |
| 0 | 0 | 0 | 0 | 0 | 0 | 0 | 0 |
| 0 | 1 | 1 | 0 | 1 | 0 | 1 | 0 |
| 0 | 0 | 0 | 1 | 1 | 1 | 0 | 0 |
| x | x | x | x | x | x | x | x |
| 0 | 0 | 0 | 0 | 0 | 0 | 0 | 1 |
| x | x | x | x | x | x | x | x |
| x | x | x | x | x | x | x | x |
| 1 | 0 | 0 | 0 | 0 | 0 | 1 | 0 |
| 0 | 0 | 0 | 0 | 0 | 0 | 1 | 0 |

Rows labeled: 161a, 161b, 161c, 161d, 161e, 161f, 161g, 161h, 161i

MULTI-CALL SIMULTANEOUS TRANSFER SYSTEM AND SWITCHBOARD

BACKGROUND OF THE INVENTION

1. Field of the Invention

The present invention relates generally to a multi-call simultaneous transfer system and a switchboard. The present invention relates more particularly to a multi-call simultaneous transfer system and a switchboard in a data network, which are capable of controlling a call transfer between terminals which can simultaneously control communication calls of a plurality of media attributes (e.g., voices, images, data, etc.).

2. Description of the Related Art

In recent years, with more sophisticated switching services in an information network, there has been increasingly demanded an actualization of the switching services through a variety of media such as voices, images, data, etc.. On this occasion, it is required that a terminal operability by a user be simple, the existing switching services be effectively utilized, and a good respondence be provided without any decline in terms of performance of the switchboard.

According to a conventional switchboard system, it has been practiced that the terminals connected to the switchboard simultaneously communicate data of a plurality of media with each other. That is, the terminals capable of simultaneously controlling a plurality of communication calls with different media attributes have hitherto performed the simultaneous communication of the plurality of media such as the voices, the images, the data, etc..

The terminals capable of simultaneously controlling the plurality of communication calls with different media attributes have been able to transfer only one call to other terminal with one transfer procedure during the simultaneous communications of the plurality of media such as voices, the images, the data, etc.. Hence, only one media among the voices, the images, the data, etc. could be transferred with one transfer procedure. Therefore, when all the communication calls of every media transferred, the calling has to be carried out once again through other media after transferring one call. There have been caused declines in terms of the system performance and the operability due to a re-acquisition of a communication line and a user's calling operation.

It is a first object of the present invention, which was devised under such circumstances, to provide a multi-call simultaneous transfer system and a switchboard that are capable of, when terminals capable of simultaneously controlling a plurality of communication calls with different media attributes transfer the communication calls to other terminals during simultaneous communications through a plurality of media, automatically transferring all the communication calls with a single transfer procedure or a designated communication call.

It is a second object of the present invention to provide a multi-call simultaneous transfer system and a switchboard that are capable of selecting whether to transfer only a communication call of empty media or to transfer no communication call when a call-transferred terminal uses a part of transfer target media.

SUMMARY OF THE INVENTION

The present invention, to accomplish the above objects, adopts the following constructions.

(First Aspect of Multi-Call Simultaneous Transfer System)

According to a first aspect of a multi-call simultaneous transfer system of the present invention, a multi-call simultaneous transfer system includes a plurality of terminals capable of simultaneously controlling communication calls of a plurality of media attributes and a switchboard, connected to the terminal, for controlling a transfer of the communication call between the terminals. The switchboard comprises a first recognizing unit for recognizing which media attribute of the communication call is executed by a call-transferring terminal and a second recognizing unit for recognizing whether or not a call-transferred terminal is capable of controlling the media attribute of the communication call executed by the call-transferring terminal.

According to the first aspect of the multi-call simultaneous transfer system of the present invention, all the communication calls can be automatically transferred with the single transfer procedure by providing the fist recognizing unit and the second recognizing unit. Then, if a selecting unit is adopted, and when the call-transferred terminal uses a part of transfer target media attributes, the call-transferring terminal is capable of selecting whether to reject the transfer or to transfer only the communication call of a not-in-use media attribute.

(Second Aspect of Multi-Call Simultaneous Transfer System)

According to a second aspect of a multi-call simultaneous transfer system of the present invention, a multi-call simultaneous transfer system comprises a plurality of terminals capable of simultaneously controlling communication calls of a plurality of media attributes and a plurality of switchboards, connected to the terminals, controlling a transfer of the communication calls between the terminals and supporting an ISDN protocol. Further, the system comprises a first recognizing unit for recognizing which media attribute of the communication call is executed by a call-transferring terminal and a second recognizing unit for recognizing whether or not a call-transferred terminal is capable of controlling the media attribute of the communication call executed by the call-transferring terminal.

According to the second aspect of the multi-call simultaneous transfer system of the present invention, all the communication calls can be automatically transferred with the single transfer procedure by providing the first recognizing unit and the second recognizing unit.

(Third Aspect of Multi-Call Simultaneous Transfer System)

According to a third aspect of a multi-call simultaneous transfer system of the present invention, a multi-call simultaneous transfer system comprises a plurality of terminals capable of simultaneously controlling communication calls of a plurality of media attributes and a plurality of switchboards, connected to the terminals, controlling a transfer of the communication calls between the terminals and supporting an ISDN protocol. Further, the system comprises a detecting unit for detecting a designation of the media attribute of the communication call to be transferred to the call-transferred terminal, which is made by the call-transferring terminal, and a transferring unit for transferring the communication call of the media attribute designated by the designation which is detected by the detecting unit.

According to the third aspect of the multi-call simultaneous transfer system of the present invention, the communication call of the predetermined media attribute can be transferred to the counter terminal by providing the detecting unit and the transferring unit.

(First Aspect of Switchboard)

According to a first aspect of a switchboard of the present invention, a switchboard is connected to each of terminals capable of simultaneously controlling communication calls of a plurality of media attributes and controls a transfer of the communication call between the terminals. This switchboard comprises a first recognizing unit for recognizing which media attribute of the communication call is executed by a call-transferring terminal and a second recognizing unit for recognizing whether or not a call-transferred terminal is capable of controlling the media attribute of the communication call performed by the call-transferring terminal.

According to the first aspect of the switchboard of the present invention, all the communication calls can be automatically transferred with the single transfer procedure by providing the first recognizing unit and the second recognizing unit.

(Second Aspect of Switchboard)

According to a second aspect of a switchboard of the present invention, a switchboard is connected to a first terminal having a function capable of simultaneously controlling communication calls of a plurality of media attributes and also connected via other switchboard to a second terminal having the same function. This switchboard comprises a detecting unit for detecting which media attribute of the communication call is to be transferred when transferring the communication call to the first terminal or the second terminal and a transferring unit for transferring the communication call of the media attribute detected by the detecting unit.

According to the second aspect of the switchboard of the present invention, the communication call of the predetermined media attribute can be transferred to the counter terminal by providing the detecting unit and the transferring unit.

BRIEF DESCRIPTION OF THE DRAWINGS

The present invention will become more fully understood from the detailed description given hereinbelow and the accompanying drawings which are given by way of illustration only, ad thus are not limitative of the present invention, and wherein:

FIG. 10 is a flowchart showing a transfer processing operation in the second embodiment;

FIG. 11 is a diagram showing configuration of SETUP message;

FIG. 12 is a diagram showing a configuration of FACILITY message;

FIG. 13 is a diagram showing a configuration of FACILITY ACK message;

DESCRIPTION OF THE PREFERRED EMBODIMENTS

Embodiments of the present invention will hereinafter be described with reference to the accompanying drawings.

First Embodiment

A first embodiment is characterized by controlling a call transfer between a plurality of terminals which can control a communication based on communication calls of a plurality of media attributes (voices, images, data, etc.) (hereinafter, referred to as multi-call communications).

<Construction>

Figure 1:
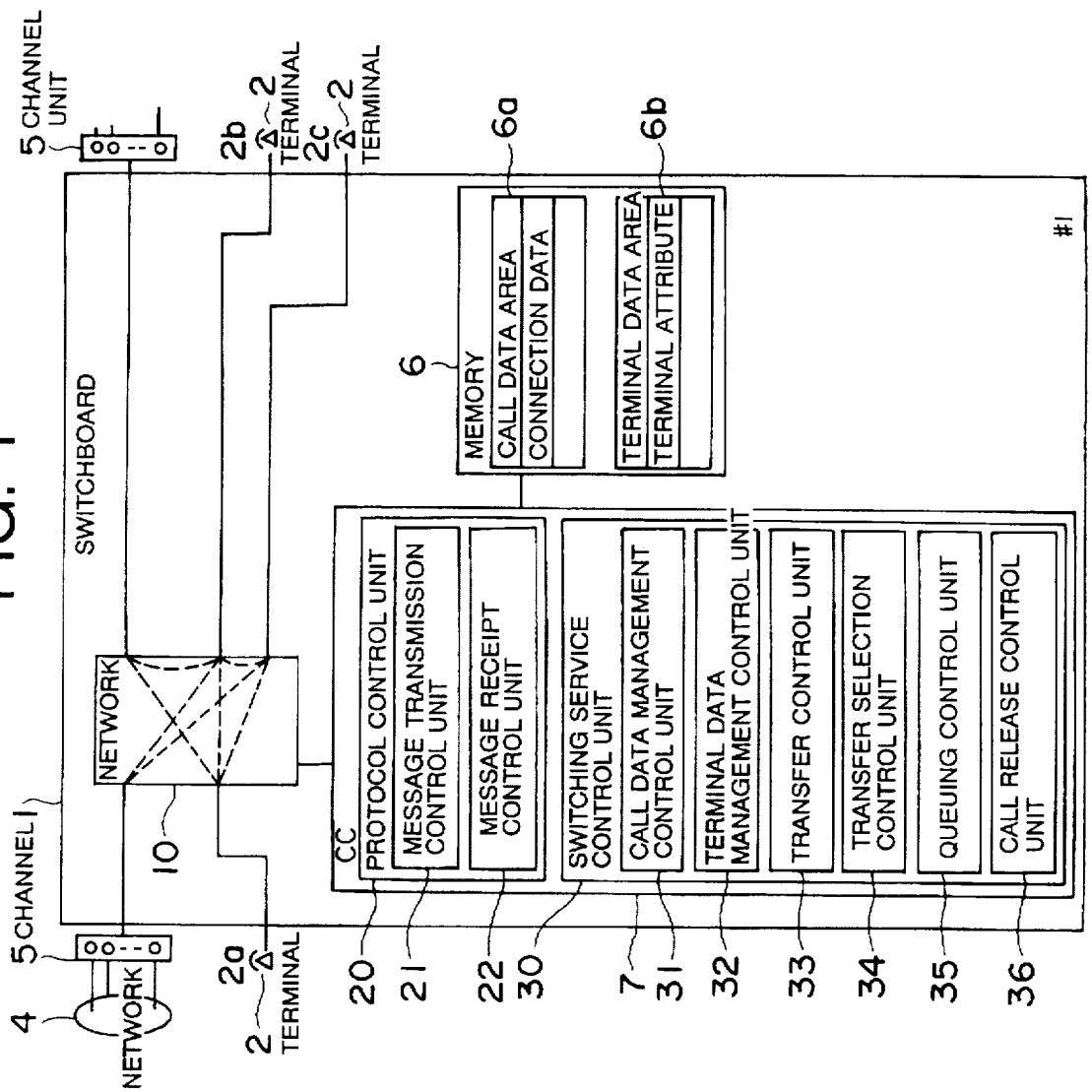
FIG. 1 is a block diagram illustrating a construction of a first embodiment.

FIG. 1 is a block diagram illustrating a construction of the first embodiment of the present invention.

(Terminal 2)

Terminals 2a–2c are capable of controlling multi-call communications and connected to a switchboard 1. Herein, the terminals 2 do not necessarily incorporate the same control function. For example, the terminal 2a or 2b has the control function relative to the voices and images, while the terminal 2c has the control function relative to the voices, images and data. Note that the number of terminals 2 is not limited to three, but four or more terminals 2 may be provided.

Further, the terminals 2a–2c have unique numbers which are connected device numbers.

(Switchboard 1)

A switchboard 1 is constructed of a network 10, a central controller (CC) 7 and a memory 6.

The network 10 is connected to a communication network 4 via a channel unit 5 provided outwardly of the switchboard 1 and also to the terminals 2a-2c. Herein, the channel unit 5 is provided with a plurality of channels. The communication network 4 may be a public network or private network.

The central controller 7 generates functions of a protocol control unit 20 and a switching service control unit 30 by executing a program. The protocol control unit 20 has a function to control an ISDN protocol. The protocol control unit 20 includes a message transmission control unit 21 for controlling a transmission of an ISDN layer-3 message and a message receipt control unit 22 for controlling a receipt of the ISDN layer-3 message.

Figure 2:
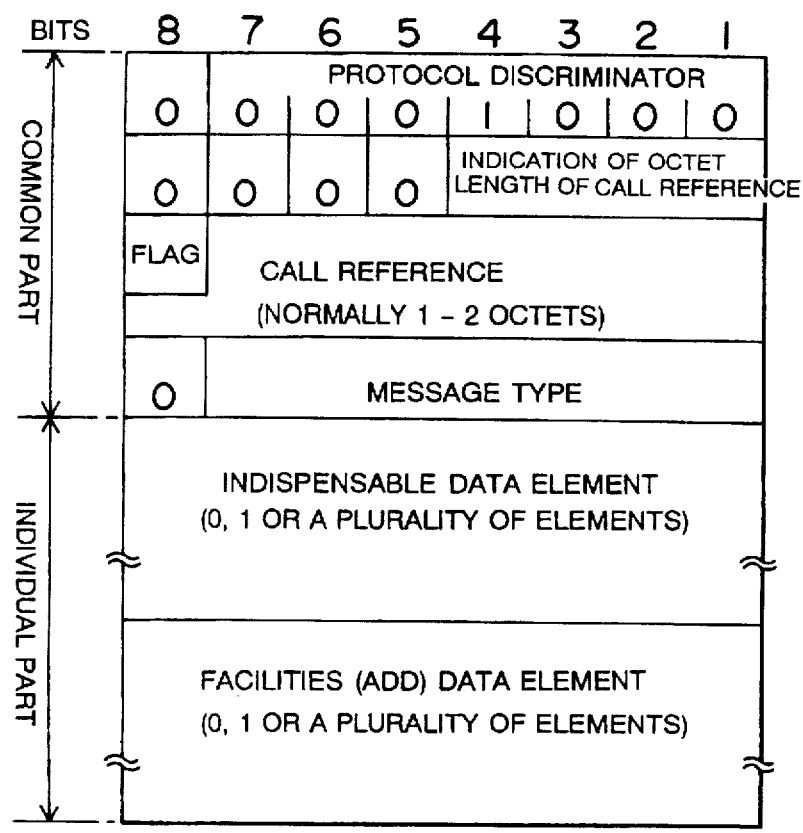
FIG. 2 is a diagram showing a structure of an ISDN layer-3 message.

Herein, the ISDN layer-3 message has, as illustrated in FIG. 2, a common part composed of a protocol discriminator, a call reference, a flag and a message type and an individual part composed of an indispensable information element and a facilities (add) data element and is constructed of multiples of an octet. Then, the common part is included in all kind of the messages of the layer 3, while the individual part differs depending on a kind of the message. Further, the flag of the common part is "0" in the message from a call starting side (a user in the case of sending a call but a network in the case of receiving the call) but is "1" in a reverse case.

The switching service control unit 30 incorporates a function to control a switching service. The switching service control unit 30 is constructed of a call data management control unit 31, a terminal data management control unit 32, a transfer control unit 33, a transfer selection control unit 34, a queuing control unit 35 and a call release control unit 36. The call data management control unit 31 manages and controls data (call data) relative to the call executed by the terminal 2. The terminal data management control unit 32 manages and controls data (terminal data) relative to the terminal 2. The transfer control unit 33 controls a transfer of the data. The transfer selection control unit 34 controls a selection of the transferred data. The queuing control unit 35 controls queuing of the transferred data. The call release control unit 36 controls releasing of the call.

Figure 3:
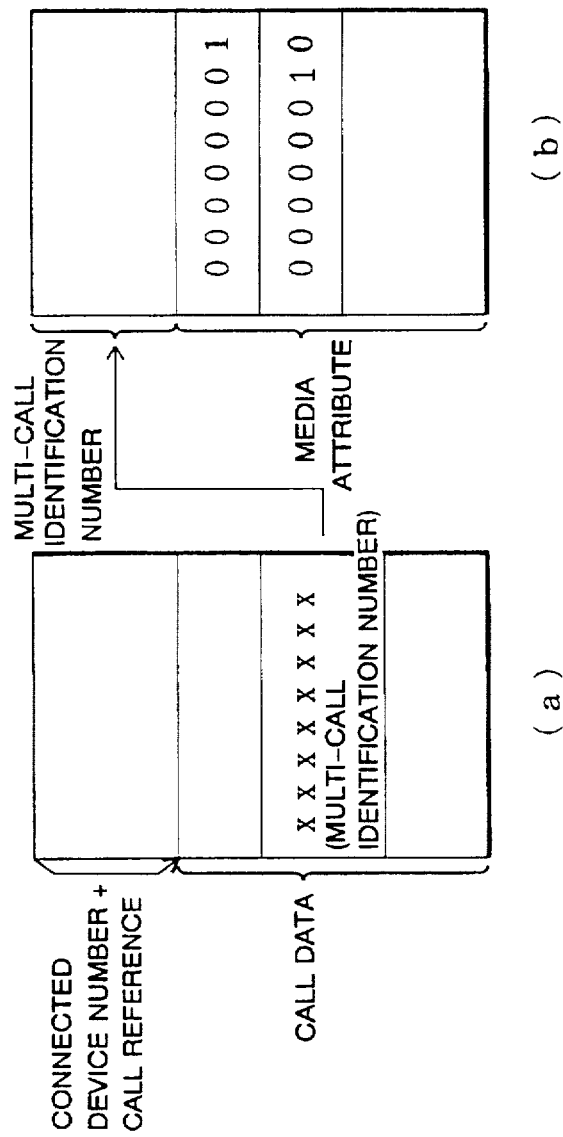
FIG. 3 is a diagram showing a structure of a call data area in the first embodiment.

The memory 6 is connected to the control controller 7 and includes a call data area 6a and a terminal data area 6b. The call data area 6a is stored with pieces of connection data (call communication data) indicating media attributes of the calls communicated between the terminals 2 in such a way that the connection data are segmented for every terminal. FIG. 3 shows a specific example of the call data area 6a. The call data area 6a is structured to retrieve the call data with a sum of a call reference and a connected device number of a terminal 2 serving as an index. Further, the call data area 6a is structured to retrieve the media attribute employed in the call, with a value of the thus retrieved call data serving as an index. In FIG. 3, a media attribute "1 (00000001)" indicates the voice, while "2 (0000010)" indicates the data.

Figure 4:
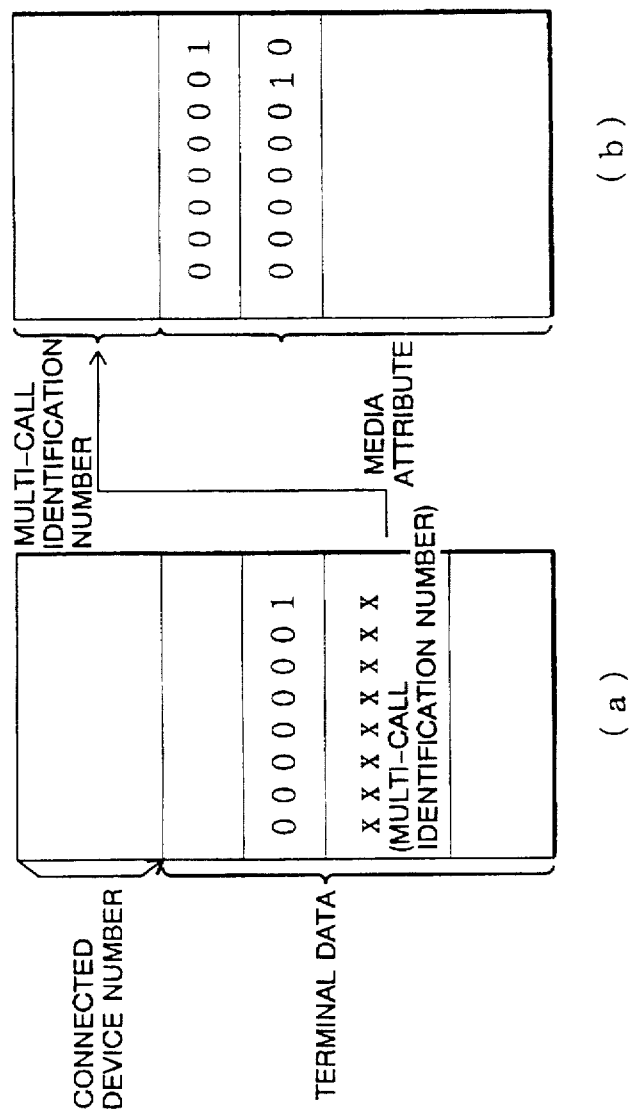
FIG. 4 is a diagram showing a structure of a terminal data area in the first embodiment.

The terminal data area 6b is stored with terminal attribute data indicating which media attribute of the communication call the terminals 2a-2c are capable of controlling. FIG. 4 illustrates a specific example of the terminal data area 6b. The terminal data area 6b is structured to retrieve the terminal data with the connected device number serving as an index. Further, the terminal data area 6b is structured to retrieve the terminal attribute data with a value of the thus retrieved terminal data serving as an index. In FIG. 4, the media attribute "1 (00000001)" indicates the voice, while "2 (0000010)" indicates the data.

<Terminal Data Registering Operation>

Figure 5:
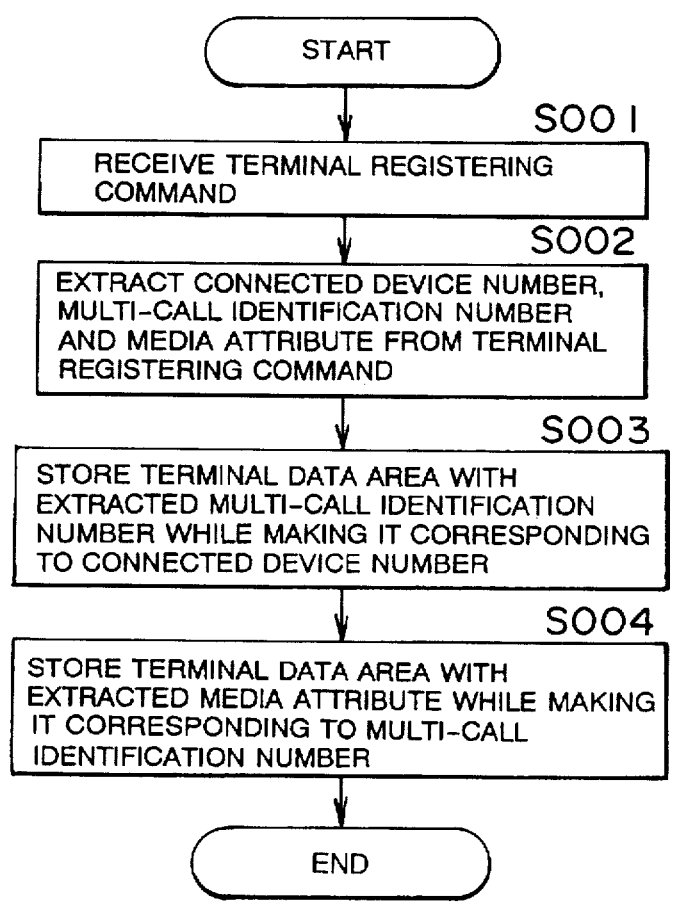
FIG. 5 is a flowchart showing a terminal data registering operation in the first embodiment.

Next, a terminal data registering process executed by the switching service control unit 30 of the switchboard 1 will be explained with reference to a flowchart of FIG. 5.

To start with, when receiving a terminal registration command from the terminal 2 (step S001), the terminal data management control unit 32 of the switching service control unit 30 extracts a connected device number, a multi-call identification number and a media attribute from the received terminal registration command (step S002).

Next, the terminal data management control unit 32 stores the terminal data area 6b with the media attribute and multi-call identification number extracted in step S002 while making them corresponding to the connected device number (step S003).

Subsequently, the terminal data management control unit 32 stores the terminal data area 6b with the media attribute extracted in step S002 while making it corresponding to the multi-call identification number (step S004).

<Call Data Registering Operation>

Figure 6:
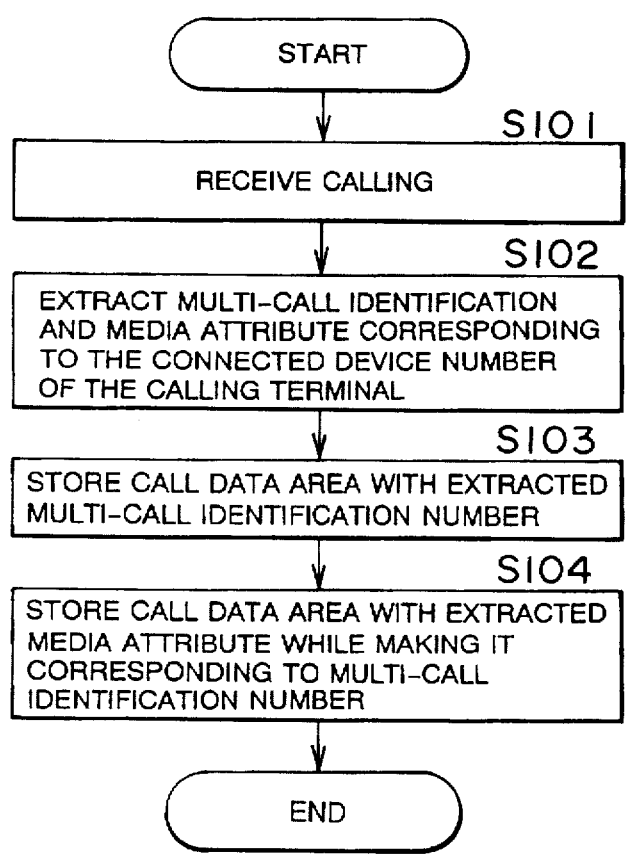
FIG. 6 is a flowchart showing a call data registering operation in the first embodiment.

Next, a call data registering process executed by the switching service control unit 30 of the switchboard 1 will be described with reference to a flowchart of FIG. 6.

At first, when receiving a calling from the terminal 2 (step S101), the call data management control unit 31 of the switching service control unit 30 extracts a corresponding multi-call identification number from the terminal data area 6b using the connected device number of the calling terminal as an index (step S102). The call data management control unit 31 also extracts a corresponding media attribute from the terminal data area 6b using the multi-call identification number as an index (step S102).

Next, the call data management control unit 31 stores the call data area 6a with the multi-call identification number extracted in step S102 (step S103).

Subsequently, the call data management control unit 31 stores the call data area 6a with the media attributes extracted in step S102 while making it corresponding to the multi-call identification number (step S104).

<Transfer Process>

Figure 7:
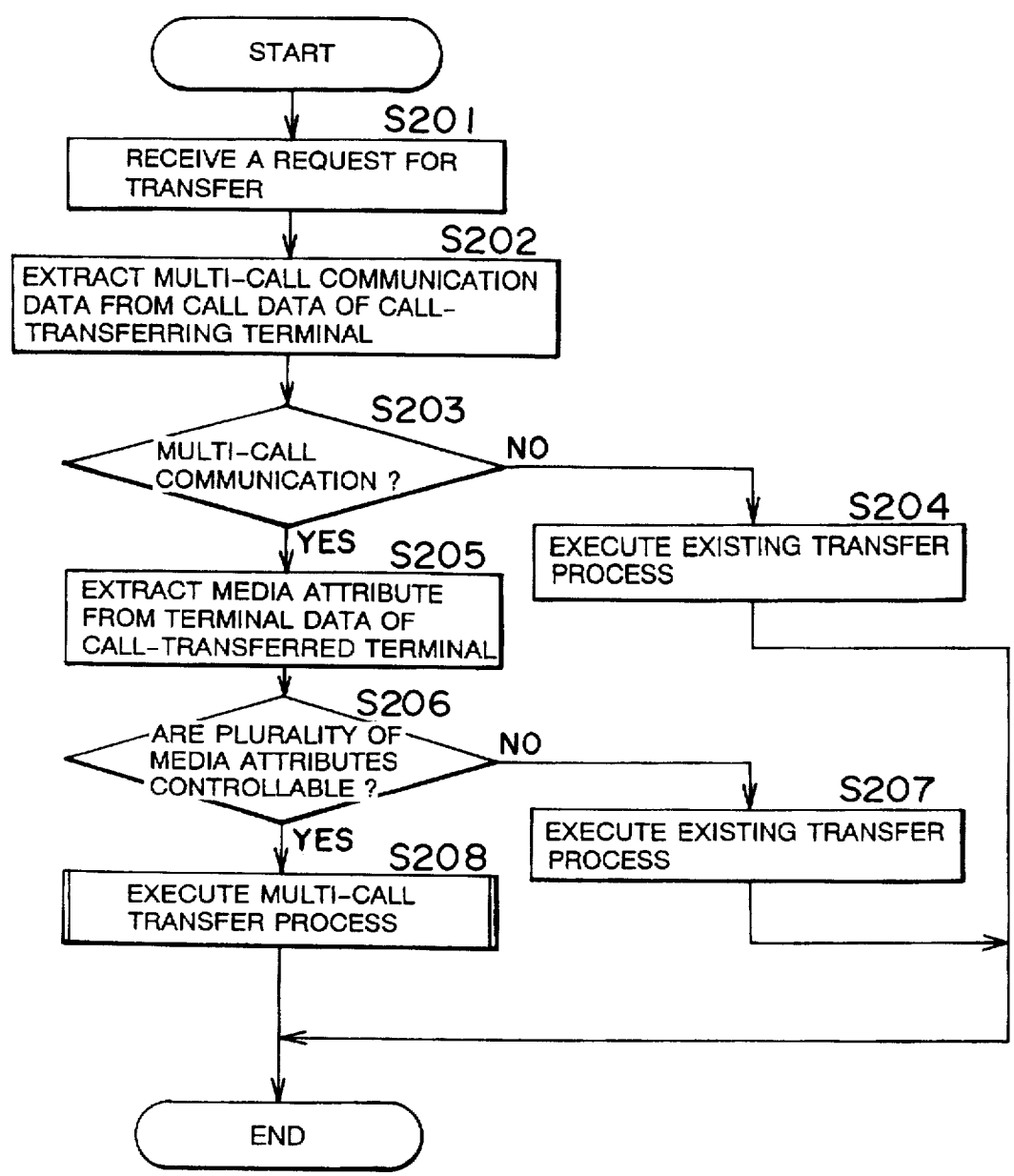
FIG. 7 is a flowchart showing a transfer processing operation in the first embodiment.

Next, a transfer process executed by the switching service control unit 30 of the switchboard 1 will be explained with reference to a flowchart of FIG. 7. In the following explanation, it is assumed that the terminal 2a performing a multi-call communication with the terminal 2b requests a transfer of the call to the terminal 2c.

When the request for transferring the call to the terminal 2c is received from the terminal 2a (step S201), the call data management control unit 31 of the switching service control unit 30 accesses the call data area 6a and extracts the call data of the call-transferring terminal 2a (step S202). Note that the call transfer request is, in the case that the terminal 2a is a telephone, made by dialing a terminal 2c number after pushing a hooking button.

Next, the terminal data management control unit 32 of the switching service control unit 30 determines whether or not the terminal 2a is on the communications through the multi-calls on the basis of the call data extracted in step S202 (step S203).

When determining that the terminal 2a is not on the communication through the multi-calls in step S203 (path of NO in step S203), the transfer control unit 33 of the switching service control unit 30 performs the existing transferring process (step S204).

Whereas if on the communication, it is determined, through the multi-calls in step S203 (path of YES in step S203), the terminal data management control unit 32 accesses the terminal data area 6b and extracts terminal attribute data (step S205).

Next, the terminal data management control unit 32 determines whether or not the terminal 2c is capable of controlling the communications of a plurality of media attributes on the basis of the terminal attribute data extracted in step S205 (step S206).

If determined to be uncontrollable in step S206 (path of NO in step S206), the transfer control unit 33 carries out the existing transfer process (step S207).

Figure 8:
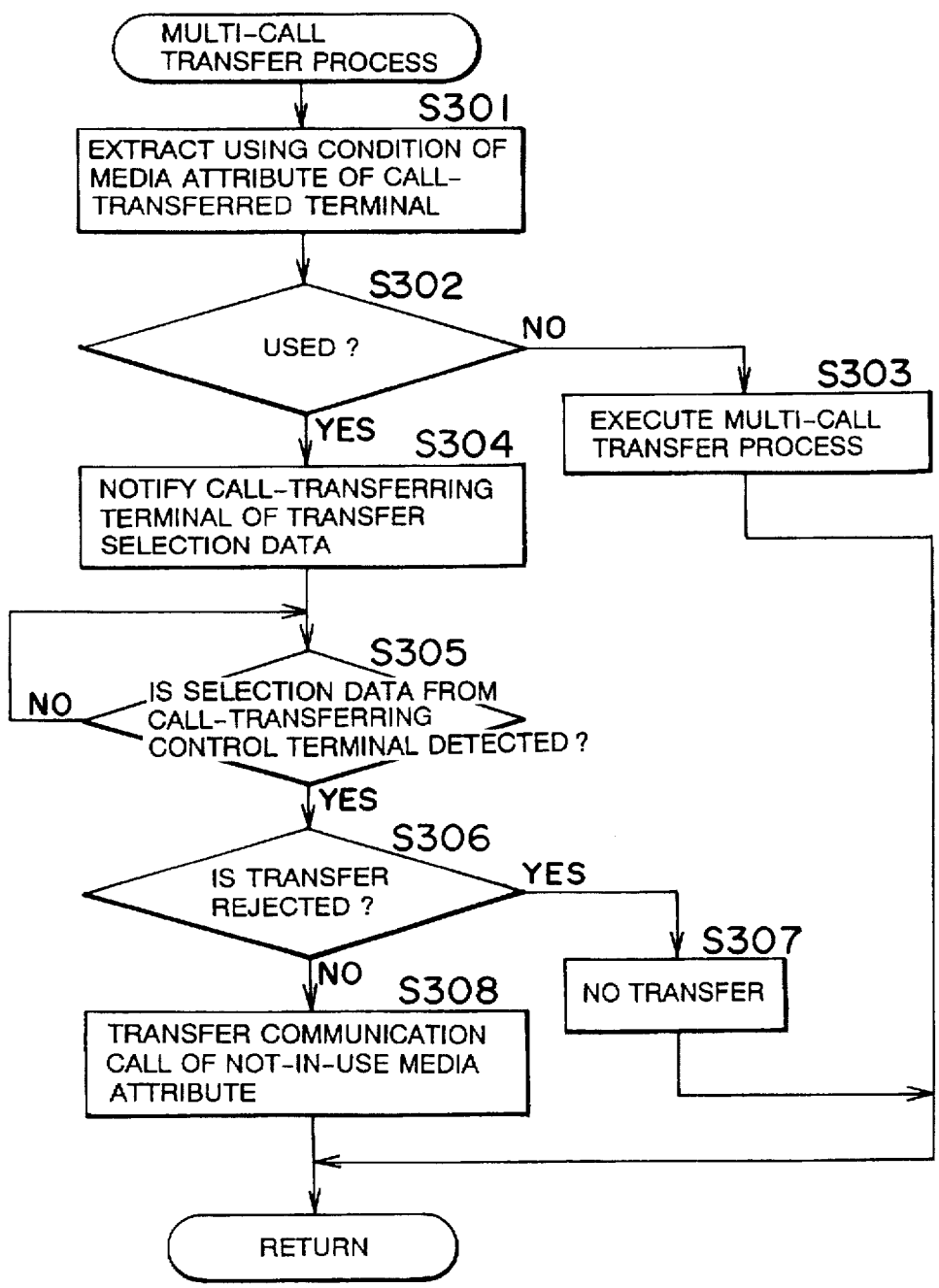
FIG. 8 is a flowchart showing a transfer processing subroutine of multi-calls executed in step S208 of FIG. 7.

Whereas if determined to be controllable in step S206 (path of YES in step S206), the transfer control unit 33 transfers communication calls of all the media attributes that are controllable by the terminal 2c (step S208). FIG. 8 is a flowchart showing a transfer process subroutine executed in step S208. In first step S301 after entering this subroutine, the call data management control unit 31 of the switching service control unit 30 accesses the call data area 6a and extracts a using condition (connecting condition), for every media attribute, of the call-transferred terminal 2c.

Subsequently, the call data management control unit 31 determines whether or not the call-transferred terminal 2c is on the communication with other terminal through the calls of a part or all of the media attributes (i.e., whether or not a part or all of the media attributes are used by the call-transferred terminal 2c) on the basis of the using condition (connecting condition) extracted in step S301 (step S302).

If the call-transferred terminal 2c is not, it is determined in step S302, on the communication with other terminal at all (i.e., all the media attributes are not being used) (path of NO in step S302), the transfer control unit 33 transfers the communication calls of all the media attributes to the terminal 2c (step S303).

Whereas if the call-transferred terminal 2c is, it is determined, on the communication with other terminal through calls of a part or all of the media attributes (i.e., a part or all of the media attributes are being used) in step S302 (path of YES in step S302), the transfer selection control unit 34 of the switching service control unit 30 notifies the call-transferring terminal 2a of transfer selection data for selecting whether to reject the transfer or to transfer only the communication call of the media attribute that the call-transferred terminal 2c is not using (step S304). The transferring terminal 2a notifies the switchboard 1 of the selection data indicating which choice has been made among those described above on the basis of this item of transfer selection data.

The transfer selection control unit 34 in the switching service control unit 30 of the switchboard 1 detects (receives) the selection data from the call-transferring terminal 2a (step S305) and determines whether or not a substance of the selection data indicates the rejection of the transfer (step S306).

If it is determined that the transfer rejection is selected in step S306 (path YES in step S306), the transfer control unit 33 transfers no communication call(step S307).

Whereas if it is determined that the transfer rejection is not selected in step S306 (path of NO in step S306), the transfer control unit 33 transfers the communication calls of all the media attributes that the call-transferred terminal 2c is not using to the terminal 2c (step S308).

As described above, according to the first embodiment, as far as the call-transferred terminal 2c is not communicating with other terminal through the calls of a part or all of the media attributes, all the communication calls can be automatically transferred with a single transfer procedure. Further, when the call-transferred terminal 2c is on the communication with other terminal through the calls of a part or all of the transfer target media attributes, the transfer selection control unit 35 inquires the call-transferring terminal 2a about whether or not it rejects the transfer.

Accordingly, the user employing the call-transferring terminal 2a is capable of selecting whether to transfer only the empty media characteristic communication call or to reject all the communication calls.

Second Embodiment

A characteristic of a second embodiment of the present invention is as compared with the first embodiment, such that a plurality of switchboards to which the terminals are connected are provided and that each switchboard, in combination with other switchboard, controls the requests for transferring the calls to the terminals connected to other switchboards, which have been issued from the terminal performing the multi-call communications connected thereto.

<Construction>

Figure 9:
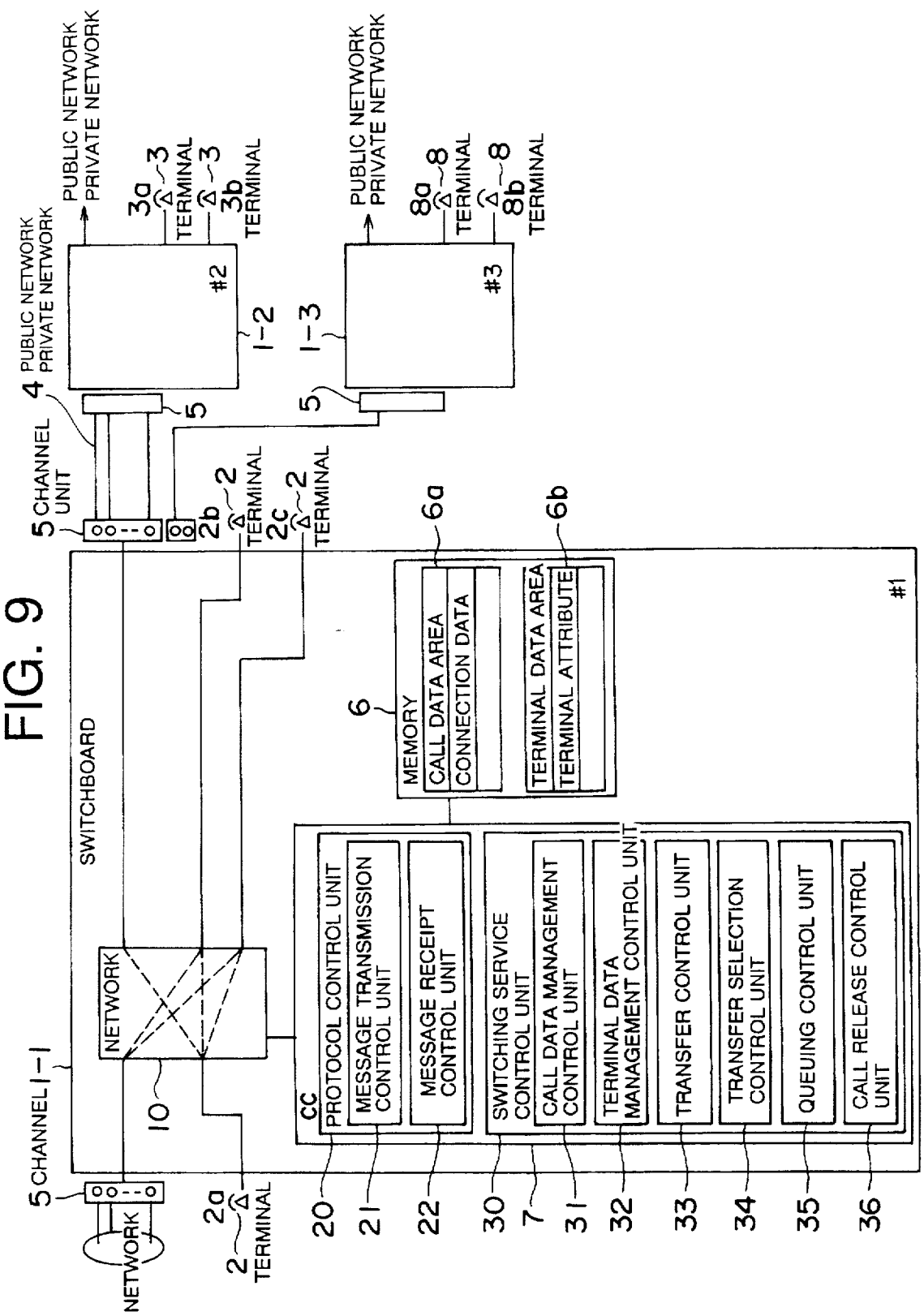
FIG. 9 is a block diagram illustrating constructions of second through fourth embodiments.

FIG. 9 is a block diagram illustrating a construction of the second embodiment of the present invention. Three switchboards 1-1, 1-2, 1-3 each have the same construction as the switchboard 1 in the first embodiment. Further, three terminals 2a–2c connected to the switchboard 1-1, two terminals 3a, 3b connected to the switchboard 1-3 and two terminals 8a, 8b connected to the switchboard 1-3 each have the same construction as the terminal 2 in the first embodiment.

<Switching Control Process>

There will be explained a switching control process executed by each switchboard in the second embodiment. FIG. 10(a) is a flowchart showing a multi-call communication setting process executed by the switchboard (call originating node) to which a call originating terminal is connected and the switchboard (call receiving node) to which a call-receiving terminal is connected in order to set the multi-call communications between nodes. FIG. 10(b) is a flowchart showing a transfer process for the case that a request for transferring a call to a terminal connected to other switchboard is given from one of the above terminals, which are executed by the switchboard (transfer control node) connected to the terminal (call-transferring terminal) making this transfer request and the switchboard (call-transferred node) connected to the terminal of the call-transferred terminal. In the following explanation, it is assumed that the terminal 2a performing the multi-call communications with the terminal 3a issues the request of the transfer to the terminal 8a. Accordingly, referring to FIG. 10, the "call originating node" and the "transfer control node" are conceived as the switchboard 1-1; the "call receiving node" is the switchboard 1-2; and the "call-transferred node" is the switchboard 1-3.

(1) Multi-Call Communication Setting Process

To begin with, when the terminal 2a originates a call through the multi-call communication (step S401), a message transmission control unit 21 of the call originating node 1-1 sets a multi-call communication identification flag (service number) indicating that it is the multi-call communication in a facilities information element of a calling message (SETUP) (step S402). Herein, the SETUP message is one of layer-3 messages used in the ISDN protocol. Then, the facilities information element as a concomitant of the SETUP message is, as illustrated in FIG. 11, composed of a first storage area 141a stored with an information element identifier, a second storage area 141b stored with an information element content length, a third storage area 141c stored with a service number of a multi-call simultaneous transfer service, etc., a fourth storage area 141d stored with an element length and a fifth storage area 141e stored with a status. The message transmission control unit 21 of the call originating node 1-1 transmits the thus edited SETUP message to the call-receiving node 1-2 (step S403).

The call-receiving node 1-2, when receiving this SETUP message (step S404), transmits a CALL PROC message to the call-originating node 1-1. The term "CALL PROC" is an abbreviation of "CALL PROCEEDING" and used for giving a notice of being on the processing for call setting.

Then, the message receipt control unit 22 of the call-receiving node 1-2 determines whether or not the identification flag indicating that it is the multi-call communication is set in the facilities information element of the SETUP message, i.e., whether or not it is a call receipt in the multi-call communication (step S405).

When it is determined that no identification flag is set, i.e., that it is not the call receipt in the multi-call communication in step S405 (path of NO in step S405), the transfer control unit 33 of the call-receiving node 1-2 performs the existing process (step S406).

When it is determined that the identification flag is set therein, i.e., that it is the call receipt in the multi-call communication in step S405 (path of YES in step S405), the call data management control unit 31 of the call-receiving node 1-2 stores the call data area 6a with a piece of data indicating that the call-receiving terminal 3a is performing the multi-call communication (step S407). Thereafter, the transfer control unit 33 of the call-receiving node 1-2 executes the existing process (step S408).

(2) Transfer Process

Next, when the terminal 2a performing the multi-call communication with the terminal 3a makes the call transfer request of the call transfer to the terminal 8a (step S409), the call data management control unit 31 of the transfer control node 1-1 accesses the call data area 6a and extracts the call data of the transfer requesting terminal 2a (step S410). Further, the call data management control unit 31 determines whether or not the terminal 2a is on the multi-call communication on the basis of the call data extracted in step S410 (step S411).

When it is determined that the terminal 2a is not on the multi-call communication in step S411 (path of NO in step S411), the transfer control unit 33 performs the existing transfer control (step S412).

When it is determined that the terminal 2a is on the multi-call communication in step S411 (path of YES in step S411), the message transmission control unit 21 writes a kind of the media attribute used in the multi-call communication to a facilities information element of an inter-nodes service message (FACILITY) and also sets an identification request flag for requesting an identification as to whether or not the call-transferred terminal 8a is capable of controlling these media attributes (step S413). Herein, the FACILITY message is one of the layer-3 messages used in the ISDN protocol. Then, the FACILITY message is, as illustrated in FIG. 12, composed of a first storage area 151a stored with a protocol discriminator, a second storage area 151b stored with a call reference, a third storage area 151c stored with the message, a fourth storage area 151d stored with an information identifier, a fifth storage area 151e stored with an information element content length, a sixth storage area 151f stored with a service number indicating a multi-call simultaneous transfer service, a seventh storage area 151g stored with an element length, an eighth storage area 151h stored with the identification request flag and a ninth storage area 151i stored with the media attributes. The message transmission control unit 21 transmits the thus edited FACILITY message to the call-transferred node 1-3 (step S414).

In the call-transferred node 1-3, when receiving this FACILITY message (step S415), the message receipt control unit 22 thereof determines whether or not the identification request flag is set in the facilities information element of the FACILITY message (step S416).

In the case of determining that the identification flag is not set therein in step S416 (path of NO in step S416), the transfer control unit 33 of the call-transferred node 1-3 executes the existing process (step S417).

While on the other hand, when determining that the identification flag is set therein in step S416 (path of YES in step S416), the terminal data management control unit 32 of the call-transferred node 1-3 accesses the terminal data area 6b and discriminates the media attributes controllable by the call-transferred terminal 8a (step S418).

Then, the message transmission control unit 21 of the call-transferred node 1-3 writes the media attribute controllable by the call-transferred terminal 8a to the facilities information element of the inter-nodes service acknowledging message (FACILITY ACK) (step S419). Herein, the FACILITY ACK message is one of the layer-3 messages used in the ISDN protocol. Then, the FACILITY ACK message is, as illustrated in FIG. 13, composed of a first storage area 161a stored with the protocol discriminator, a second storage area 161b stored with the call reference, a third storage area 161c stored with the message, a fourth storage area 161d stored with the information element identifier, a fifth storage area 161e stored with the information element content length, a sixth storage area 161f stored with the service number indicating the multi-call simultaneous transfer service, a seventh storage area 161g stored with the element length, an eighth storage area 161h stored with "Return result" and a ninth storage area 161i stored with a identification flag indicating transferrable/ untransferable states. The message transmission control unit 21 of the call-transferred node 1-3 transmits the thus edited FACILITY ACK message to the transfer control node 1-1 (step S420).

In the transfer control node 1-1, when receiving this FACILITY ACK message (step S421, the message receipt control unit 22 reads the media attribute written to the facilities information element of the FACILITY ACK message. Checked subsequently is whether or not each of the media attributes used in the multi-call communications performed by the call-transferring terminal 2a is controllable by the call-transferred terminal 8a (step S422).

When it is determined that there is no media attribute controllable by the call-transferred terminal 8a in step S422 (path of NO in step S422), the transfer control unit 33 performs the existing transfer (step S423).

While on the other hand, when it is determined that there is the media attribute controllable by the call-transferred terminal 8a in step S422 (path of YES in step S422), the transfer control unit 33 transfers the communication calls of all the media attributes controllable by the call-transferred terminal 8a (step S424) to the terminal 8a.

Thus, according to the second embodiment, all the communication calls can be automatically transferred with the single transfer procedure.

Third Embodiment

A different point of a third embodiment of the present invention from the second embodiment is that the transfer control terminal makes the call-transferring terminal select whether the transfer is rejected or not when the call-transferred terminal uses a part of the transfer target media attributes. Other configurations thereof are, however, the same. Accordingly, other explanations thereof will be omitted.

<Switching Control Process>

A switching control process executed in each switchboard in a third embodiment will be described.

(1) Multi-Call Communication Setting Process

According to the third embodiment also, as in the same way with the second embodiment, the multi-call communication setting process shown in FIG. 10(a) is executed for setting the inter-nodes multi-call communications.

(2) Transfer Process

Figure 14:
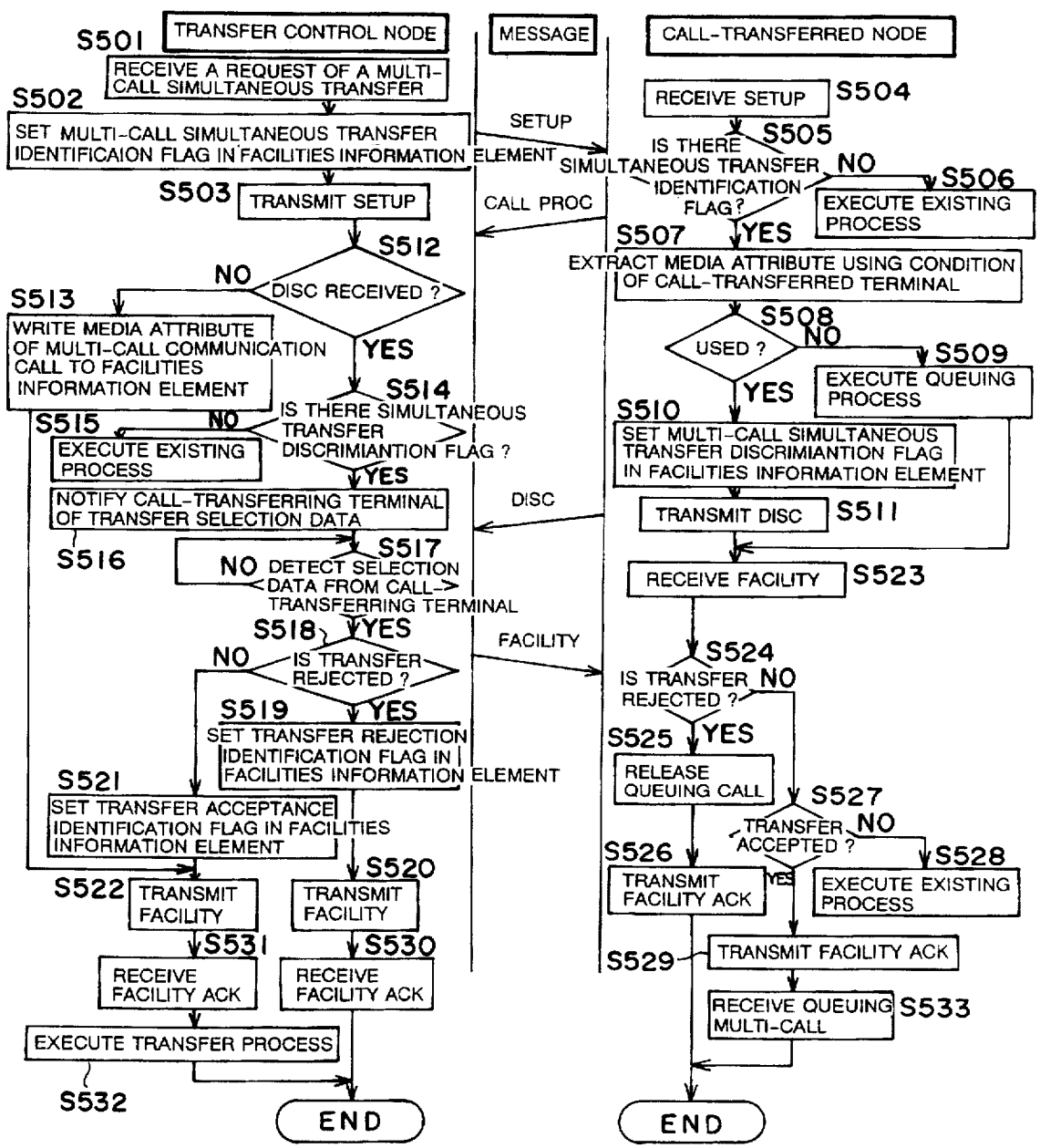
FIG. 14 is a flowchart showing a transfer processing operation in the third embodiment.

FIG. 14 is a flowchart showing a transfer process in the third embodiment. The flowchart of FIG. 14 shows a transfer process for the case that one of the two terminals performing the multi-call communication makes a request for transferring the call to the terminal connected to other switchboard, which are executed by the switchboard (transfer control node) connected to the terminal (call-transferring terminal) making that transfer request and the switchboard (call-transferred node) connected to the call-transferred terminal. In the following explanation, it is assumed that the terminal 2a performing the multi-call communication with the terminal 3a issues the request of the call transfer to the terminal 8a. Hence, referring to FIG. 14, the "transfer control node" is the switchboard 1-1, while the "call-transferred node" is the switchboard 1-3.

To start with, when the terminal 2a performing the multi-call communication with the terminal 3a makes a request for a multi-call simultaneous transfer to the terminal 8a (step S501), the message transmission control unit 21 of the transfer control node 1-1 sets a multi-call simultaneous transfer identification flag indicating the multi-call simultaneous transfer in the facilities information element of the calling message (SETUP) (step S502). The message transmission control unit 21 of the transfer control node 1-1 transmits the thus edited SETUP message to the call-transferred node 1-3 (step S503). Thereafter, the message receipt control unit 21 of the transfer control node 1-1 waits for a receipt of a DISC message from the call-transferred node 1-3 (step S512).

The call-transferred node 1-3 transmits, upon receiving the SETUP message (step S504), a CALL PROC message to the transfer control node 1-1.

Then, the message receipt control unit 22 of the call-transferred node 1-3 determines whether or not the multi-call simultaneous transfer identification flag indicating the multi-call simultaneous transfer is set in the facilities information element of the SETUP message, i.e., whether or not the request is defined as request for the multi-call simultaneous transfer (step S505).

When it is determined that there is no multi-call simultaneous transfer identification flag, viz., that it is not the multi-call simultaneous transfer request in step S505 (path of NO in step S505), the transfer control unit 33 of the call-transferred node 1-3 executes the existing process (step S506).

When it is determined that there is the multi-call simultaneous transfer identification flag, i.e., that it is the multi-call simultaneous transfer request in step S505 (path of YES in step S505), the call data management control unit 31 of the call-transferred node 1-3 accesses the call data area 6a and extracts a using condition (connecting condition) for every media attribute, of the call-transferred terminal 8a (step S507).

Then, the call data management control unit 31 of the call-transferred node determines whether or not the call-transferred terminal 8a is on the communication with other terminal through the calls of a part or all of the media attributes (i.e., whether or not a part or all of the media attributes are being used) on the basis of the using condition (connecting condition) extracted in step S507 (step S508).

When it is determined that the call-transferred terminal 8c is not on the communication with other terminal at all (i.e., all the media attributes are not being used) (path of NO in step S508), the queuing control unit 35 of the call-transferred node 1-3 queues the call (step S509). That is, the queuing control unit 35 waits till the call-transferring terminal 2a transmits a piece of selection data indicating whether to reject the transfer or to effect the transfer. Thereafter, the message receipt control unit 22 of the call-transferred node 1-3 waits for a transmission of the FACIL-ITY message from the transfer control node 1-1.

When it is determined that the call-transferred terminal 8a is on the communication with other terminal through a part or all of the media attributes (i.e., a part or all of the media attributes are being used) in step S508 (path of YES in step S508), the message transmission control unit 21 of the call-transferred node 1-3 sets an identifier (service number) indicating that it is the multi-call simultaneous transfer in a facilities information element of a call-cut request message (DISC) (step S510). Herein, the DISC message is one of the layer-3 messages used in the ISDN protocol. Then, the facilities information element as a concomitant of the DISC message is, as illustrated in FIG. 11, composed of a first storage area 141a stored with the information element identifier, a second storage area 141b stored with the information element content length, a third storage area 141c stored with the service number of the multi-call simultaneous transfer, a fourth storage area 141d stored with the element length and a fifth storage area 141e stored with the status. The message transmission control unit 21 of the call-transferred node 1-3 transmits the thus edited DISC message to the transfer control node 1-1 (step S511). Thereafter, the message receipt control unit 22 of the call-transferred node 1-3 waits for a transmission of the FACIL-ITY message from the transfer control node 1-1.

In the transfer control node 1-1, when receiving this DISC message (path of YES in step S512), the message receipt control unit 22 thereof determines whether or not the multi-call simultaneous transfer identification flag (service number) indicating that it is the multi-call simultaneous transfer in the facilities information element of the DISC message (step S514).

When it is determined that the multi-call simultaneous transfer identification flag (service number) is not set therein in step S514 (path of NO in step S514), the transfer control unit 33 of the transfer control node 1-1 performs the existing process (step S515).

While on the other hand, when it is determined that the multi-call simultaneous transfer identification flag (service number) is set therein in step S514 (path of YES in step S514), the transfer selection control unit 34 of the transfer control node 1-1 notifies the call-transferring terminal 2a of transfer selection data for making the terminal 2a select whether to reject the transfer or to transfer only the communication call of the media attribute that is not used by the call-transferred terminal 8a(step S516).

The transfer selection control unit 34 of the transfer control node 1-1 detects (receives) the selection data from the call-transferring terminal 2a (step S517) and then determines whether or not a substance of the selection data shows a rejection of the transfer (step S518).

When it is determined that the rejection of the transfer is selected in step S518 (path of YES in step S518), the message transmission control unit 21 of the transfer control node 1-1 sets a identification flag indicating the rejection of the transfer in the facilities information element of the inter-nodes service message (FACILITY) (step S519). The message transmission control unit 21 transmits the thus edited FACILITY message to the call-transferred node 1-3 (step S520). Thereafter, when receiving the FACILITY ACK message responding to this FACILITY message, the transfer control unit 33 of the transfer control node 1-1 finishes this transfer control.

While on the other hand, when it is determined that the rejection of the transfer is not selected in step S518 (path of NO in step S518), the message transmission control unit 21 sets an identification flag indicating that the terminal 2a will transfer the communication call in the facilities information element of the inter-nodess service message (FACILITY) (step S521). The message transmission control unit 21 transmits the thus edited FACILITY message to the call-transferred node 1-3 (step S522). Thereafter, when receiving the FACILITY ACK message responding to this FACILITY message, the transfer control unit 33 of the transfer control node 1-1 transfers only the communication call of the media attribute that is not used by the call-transferred terminal 8a to the call-transferred node 1-3 (step S532).

On the other hand, when the DISC message is not received in step S512 (path of NO in step S512), the message transmission control unit 21 of the transfer control node 1-1 writes kinds of the media attributes used by the call-transferring terminal 2a in the multi-call communication to the facilities information element of the inter-nodes service message (FACILITY) (step S513). The message transmission control unit 21 transmits the thus edited FACILITY message to the call-transferred node 1-3 (step S522). Thereafter, when receiving the FACILITY ACK message responding to this FACILITY message, the transfer control unit 33 of the transfer control node 1-1 transfers the communication calls of all the media attributes used by the call-transferring terminal 2a to the call-transferred node 1-3 (step S532).

In the call-transferred node 1-3, when receiving this FACILITY message transferred in step S520 or S522 (step S523), the message receipt control unit 22 thereof determines whether or not the identification flag indicating the rejection of the transfer is set in the facilities information element of the FACILITY message (step S524).

In the case of determining that the identification flag indicating the rejection of the transfer is not set therein in step S524 (path of NO in step S524), the transfer control unit 33 of the call-transferred node 1-3 checks whether or not the multi-call simultaneous transfer is possible (step S527). Then, if the multi-call simultaneous transfer is impossible, the transfer control unit 33 carries out the existing process (step S528).

Whereas if the multi-call simultaneous transfer is possible, the message transmission control unit 21 of the call-transferred node 1-3 writes, to the facilities information element of the FACILITY ACK message, all the media attributes written to the facilities information element of the FACILITY message by the transfer control node 1-1 in step S513 or all the media attributes that are not used by the call-transferred terminal 8a. Then, the thus edited FACILITY ACK message is transmitted to the transfer control node 1-1 (step S529). Thereafter, the transfer control unit 33 of the call-transferred node 1-3 receives the multi-calls transferred by the transfer control node 1-1 in step S532.

On the other hand, when it is determined that the identification flag showing the rejection of the transfer is set in step S524 (path of YES in step S524), the call release control unit 36 of the call-transferred node 1-3 releases the call queuing relative to the media attribute that is not used by the call-transferred terminal 8a. That is, the same unit 36 rejects receiving the call from the transfer control node 1-1 with respect to the calls using those media attributes. Thereafter, the message transmission control unit 21 of the call-transferred node 1-3 transmits the FACILITY ACK message transferred responding to the FACILITY message in step S520 (step S526) and directly finishes this transfer control.

Thus, according to the third embodiment, in the case of transferring the calls using the plurality of media attributes to the terminal connected to other node, the call-transferring node 1-1 is capable of recognizing the media attributes employed by the call-transferred terminal 8a. Further, if the call-transferred terminal 3c is on the communication with other terminal through the calls of a part or all of the transfer target media attributes, the transfer selection control unit 35 makes an inquiry about whether or not the transfer is rejected to the call-transferring terminal 2a. Accordingly, the user employing the call-transferring terminal 2a is capable of selecting whether to transfer only communication calls of the empty media attributes or to reject the transfer of all the communication calls.

Fourth Embodiment

A fourth embodiment of the present invention has a difference from the second embodiment in terms of only such a point that the call-transferring terminal designates a transfer target media attribute, but other configurations are the same. Hence, other explanations will be omitted.

<Switching Control Process>

The switching control process executed by each switchboard in the fourth embodiment will be described.

(1) Multi-Call Communication Setting Process

According to the fourth embodiment also, as in the same way with the second embodiment, the multi-call communication setting process shown in FIG. 10(a) is executed for setting the inter-nodes multi-call communications.

(2) Transfer Process

Figure 15:
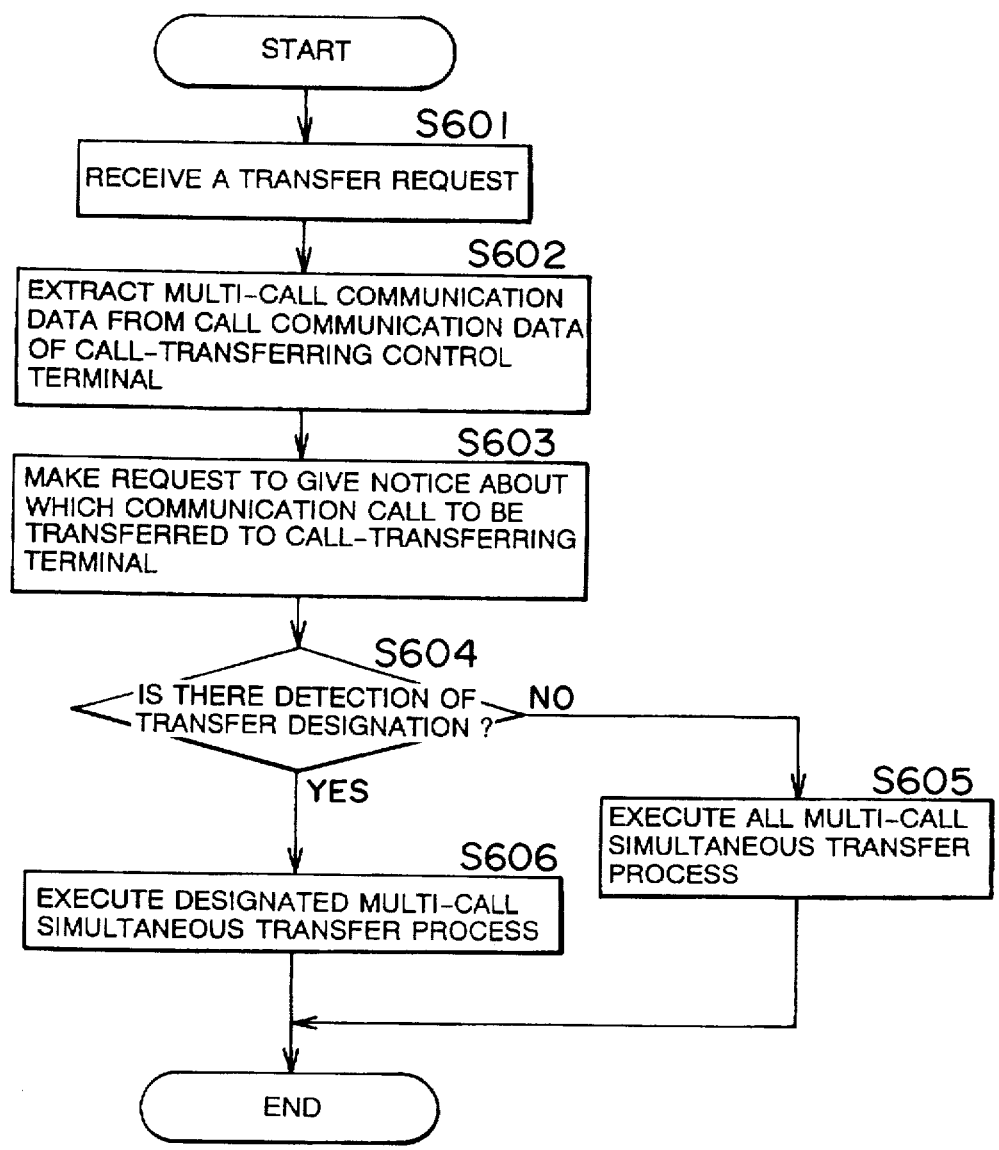
FIG. 15 is a flowchart showing a transfer processing operation in the fourth embodiment.

FIG. 15 is a flowchart showing a transfer process in the fourth embodiment. The flowchart of FIG. 15 shows a transfer process for the case that one of the two terminals performing the multi-call communication makes a request for transferring the call to other terminal, which are executed by the switchboard (transfer control node) connected to the terminal (call-transferring terminal) making this transfer request. In the following explanation, it is assumed that the terminal 2a performing the multi-call communication with the terminal 2b issues the request of the call transfer to the terminal 2c. Hence, the switchboard 1-1 is the transfer control node.

When the terminal 2a makes the transfer request (step S601), the call data management control unit 31 of the transfer control node 1-1 accesses the call data area 6a and extracts the call communication data of the transfer requesting terminal 2a (step S602).

Then, the transfer selection control unit 34 of the transfer control node 1-1 requests the call-transferring terminal 2a to designate which media attribute of the communication call in transferred (step S603).

When there is a response to the request of step S603, the transfer selection control unit 34 detects whether or not the response includes a transfer designation (step S604).

When it is detected that it includes the transfer designation in step S604 (path of YES in step S604), the transfer control unit 33 performs a simultaneous transfer process of only the call of the transfer-designated media attribute (step S606).

When it is detected that the response includes no transfer designation in step S604 (path of NO in step S604), the transfer control unit 33 simultaneously transfer all the multi-calls (step S605).

As discussed above, according to the fourth embodiment, the call-transferring terminal is capable of selecting whether to transfer the calls using all the media attributes or only the call of the designated media attribute.

Fifth Embodiment

A fifth embodiment has, as compared with the first embodiment, such a characteristic that the call-transferring terminal designates a transfer target media attribute.

<Construction>

Figure 16:
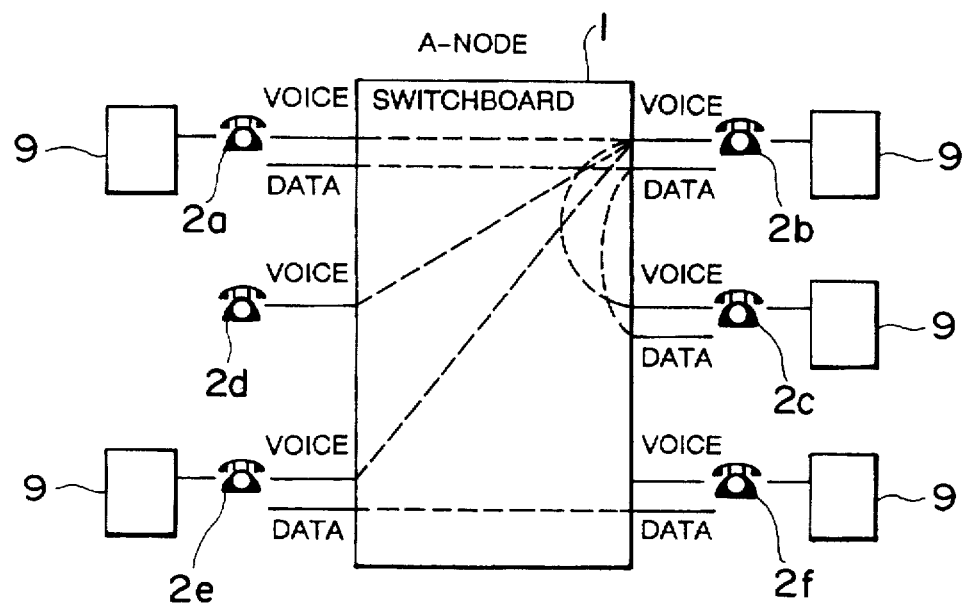
FIG. 16 is a diagram illustrating a construction in a fifth embodiment.

FIG. 16 is a block diagram illustrating a construction of the fifth embodiment of the present invention.

(Terminal 2)

The terminals 2 are individually marked with symbols a–f for identifications from each other. Terminals 2a–2f are each connected to the switchboard 1. Among the terminals 2a–2f, the terminal 2d is capable of controlling only the audio call communications, while other terminals 2a–2c and 2e–2f are capable of controlling audio/data multi-call communications. Computers 9 for executing the data processing are connected to those terminals 2a–2c and 2e–2f.

(Switchboard 1)

The switchboard 1 has the same construction as the switchboard in the first embodiment.

<Transfer Process>

Figure 17:
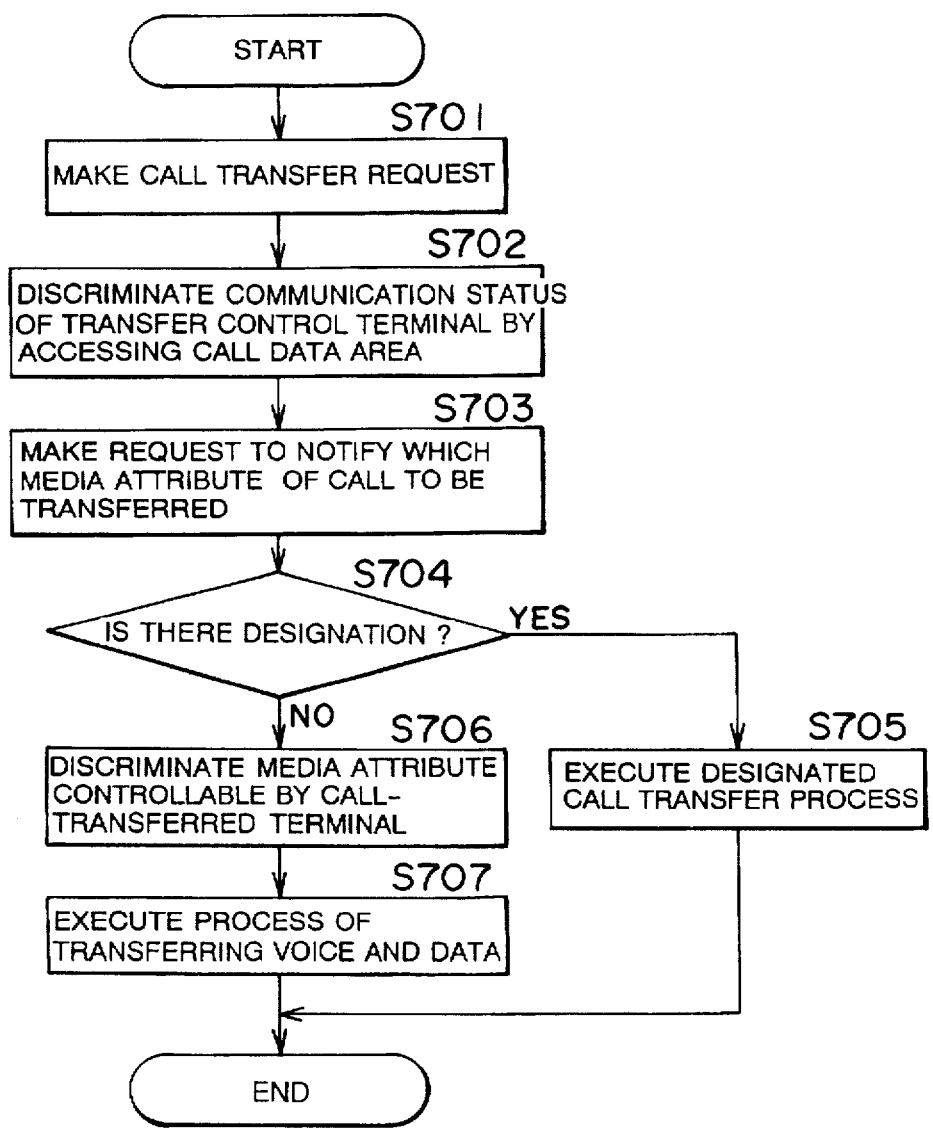
FIG. 17 is a flowchart showing the transfer processing operation in the fifth embodiment.
Figure 18:
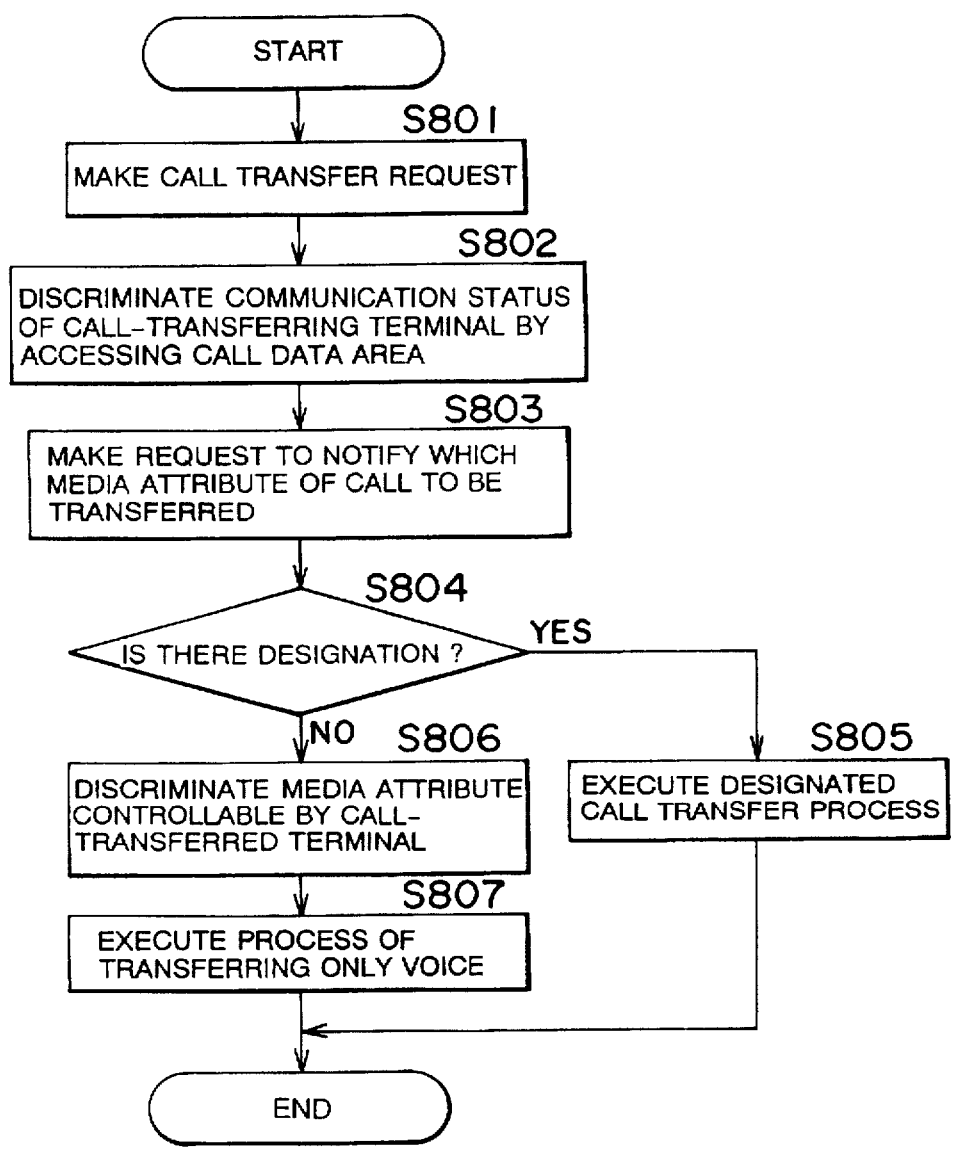
FIG. 18 is a flowchart showing the transfer processing operation in the fifth embodiment.
Figure 19:
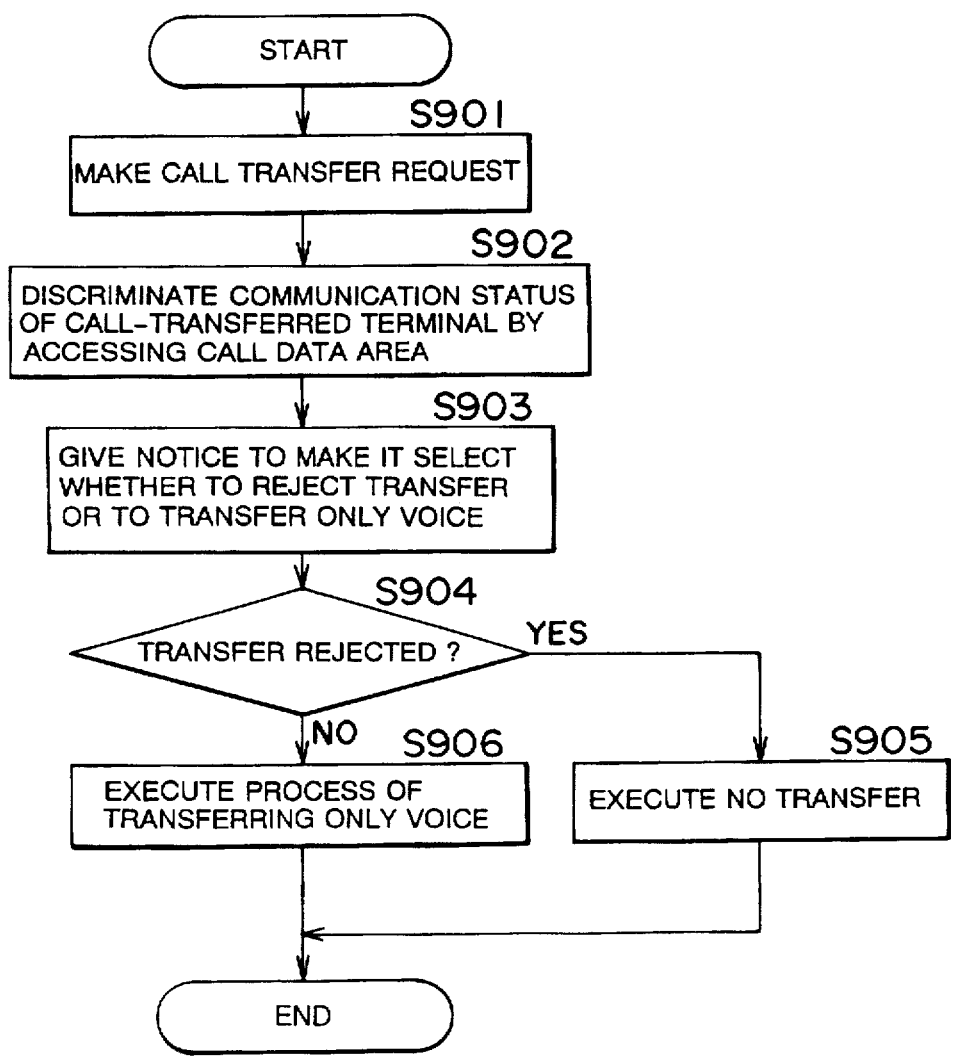
FIG. 19 is a flowchart showing the transfer processing operation in the fifth embodiment.

A transfer process executed in the switchboard 1 in the fifth embodiment will be described. FIGS. 17–19 are flowcharts each showing the transfer process in the fifth embodiment.

At first, the terminal 2a performing the multi-call communication with the terminal 2b makes the request of call transfer to the terminal 2c (step S701). Note that the call transfer request is, if the terminal 2a is a telephone, made by dialing the terminal 2c number after pushing the hooking button.

Hereupon, the call data management control unit 31 of the switchboard 1 accesses the call data area 6a, thereby extracting the call communication data of the transfer requesting terminal (call-transferring terminal) 2a and also discriminating a communication status of the terminal 2a on the basis of the extracted call communication data (step S702). In this step S702, it is discriminated that the terminal 2a is on the multi-call communication with the terminal 2b.

Then, the transfer selection control unit 34 of the switchboard 1 requests the call-transferring terminal 2a to designate which media attribute of the communication call on the multi-call communication is transferred (step S703).

When the terminal 2a designates any media attributes (path of YES in step S704), the transfer process of the designated communication call is carried out (step S705). For example, if only a voice is designated, there is executed the transfer process of only the voice-used communication call.

Whereas if the terminal 2a designates nothing about the transfer (path of NO in step S704), the terminal data management control unit 32 of the switchboard 1 accesses the terminal data area 6b, thereby discriminating the media attribute controllable by the call-transferred terminal 2c (step S706). In this step S706, the terminal data management control unit 32 discriminates that the call-transferred terminal 2c is capable of controlling the voice/data communication calls.

Hence, the transfer control unit 33 of the switchboard 1 effects the process of transferring the communication calls of voices and the data from the terminal 2a to the terminal 2c (step S707).

Next, when the terminal 2a performing the multi-call communication with the terminal 2b makes the request of call transfer to the terminal 2d (step S801), the same processes as steps S702–S703 (steps S802–S803).

Then, when the terminal 2a designates any media attributes (path of YES in step S804), only the designated call transfer process is conducted (step S805).

Whereas if the terminal 2a designates nothing about the transfer (path of NO in step S804), the terminal data management control unit 32 of the switchboard 1, accesses the terminal data area 6b and discriminates a media attribute controllable by the call-transferred terminal 2d (step S806).

In step S806, the identification is made such that the call-transferred terminal 2d is capable of controlling only the voice communication call, and, therefore, the transfer control unit 33 of the switchboard 1 performs the process of transferring only the communication call of voice from the terminal 2a to the terminal 2d (step S807).

Next, during the communication call of which media attribute is data executed by the terminals 2e and 2f, it is assumed that the terminal 2a performing the multi-call communication with the terminal 2b makes the request of call transfer to the terminal 2e (step S901). In this case, the call data management control unit 31 of the switchboard 1 accesses the call data area 6a to extract the call communication data of the transfer requested terminal 2e and discriminates a communication status of the terminal 2e (step S902). In this step S902, the identification is made such that the communication call of which media attribute is data is conducted between the terminal 2e and the terminal 2f.

As a result, the transfer control unit 34 of the switchboard 1 gives a notice making it select whether to reject the transfer or to transfer only the voice communication call to the transfer-requesting terminal 2a (step S903).

If the terminal 2a rejects the transfer (path of YES in step S904), the transfer control unit 33 of the switchboard 1 does not perform the transfer to the terminal 2e (step S905).

Whereas if the terminal 2a does not reject the transfer (path of NO in step S904), the transfer control unit 33 transfers only the communication call of voice from the terminal 2a to the terminal 2e (step S906).

<Sixth Embodiment>

A characteristic of ta sixth embodiment of the present invention is that the request of call transfer to the terminal connected to other switchboard is, as in the same way with the second embodiment, controlled by the plurality of switchboards in combination.

<Construction>

Figure 20:
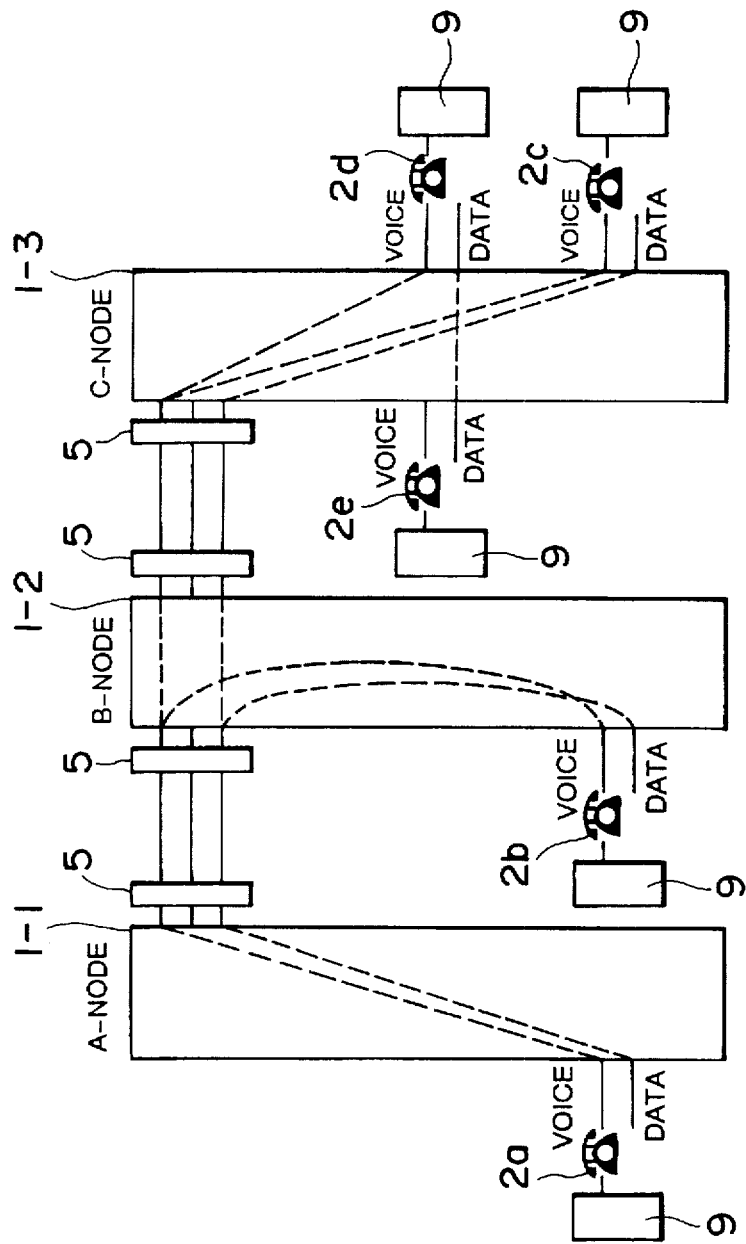
FIG. 20 is a diagram illustrating a construction of a sixth embodiment.

FIG. 20 is a block diagram illustrating a construction of the sixth embodiment of the present invention. Three switchboards 1-1 through 1-3 each have the same construction as the switchboard 1 in the first embodiment. The switchboards 1-1, 1-2 and 1-3 are referred to as an A-node, a B-node and a C-node, respectively.

The terminal 2a is connected to the A-node 1-1. Further, the terminal 2b is connected to the B-node 1-2. Then, the terminals 2c–2e are connected to the C-node 1-3. The terminals 2a–2e are each capable of controlling the voice/data multi-call communications. The computers 9 for performing the data processing are connected to those terminals 2a–2e.

<Switching Control Process>

Control processes conducted in this sixth embodiment will be explained in sequence.

(1) A multi-call communication setting process carried out by the A-node 1-1 and the B-node 1-2 for performing the multi-call communication between the terminal 2a of the A-node 1-1 and the terminal 2b of the B-node 1-2.

Figure 21:
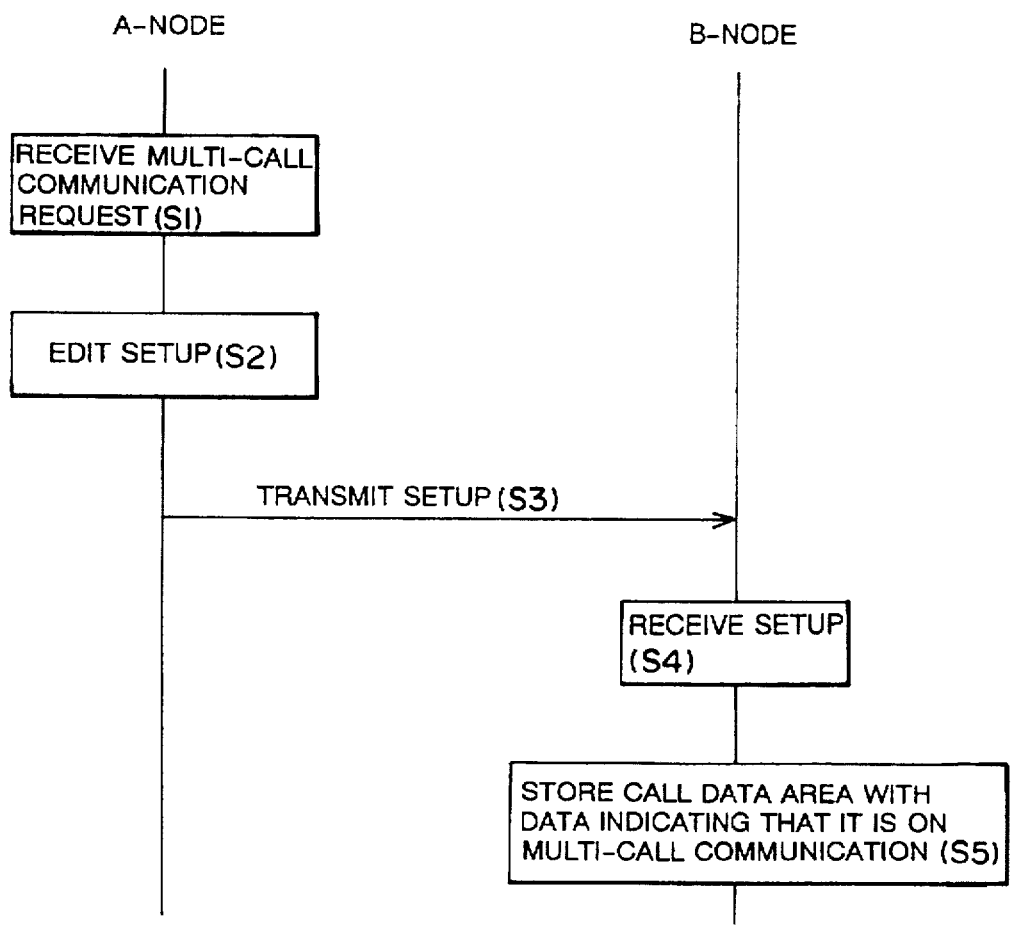
FIG. 21 is a sequence diagram showing processing operations of A- and B-nodes for performing a multi-call communications between a terminal 2a of the A-node and a terminal 2b of the B-node.

FIG. 21 is a sequence diagram showing the multi-call communication setting process executed by the A-node 1-1 and the B-node 1-2 in order to effect the multi-call communication between the terminal 2a connected to the A-node 1-1 and the terminal 2b connected to the B-node 1-2.

To start with, the A-node 1-1, on receiving the multi-call communication request to the terminal 2b of the B-node 1-2 from the terminal 2a (step S1), sets a multi-call communication identification flag giving an indication of being the multi-call communication in the facilities information element of the SETUP message (step S2) and also transmits the thus edited SETUP message to the B-node 1-2 (step S3).

The B-node 1-2, when receiving the SETUP message (sep S4), and if there is the facilities information element of the SETUP message contains the multi-call identification flag, stores its call data area 6a with a piece of data indicating that the terminal 2b is on the voice/data multi-call communication (step S5).

(2) A transfer processes is executed by the A-node 1-1 and the B-node 1-2 when the terminal 2b of the B-node 1-2 performing the multi-call communication with the terminal 2a of the A-node 1-1 makes the call transfer request to the terminal 2c of the C-node 1-3.

Figure 22:
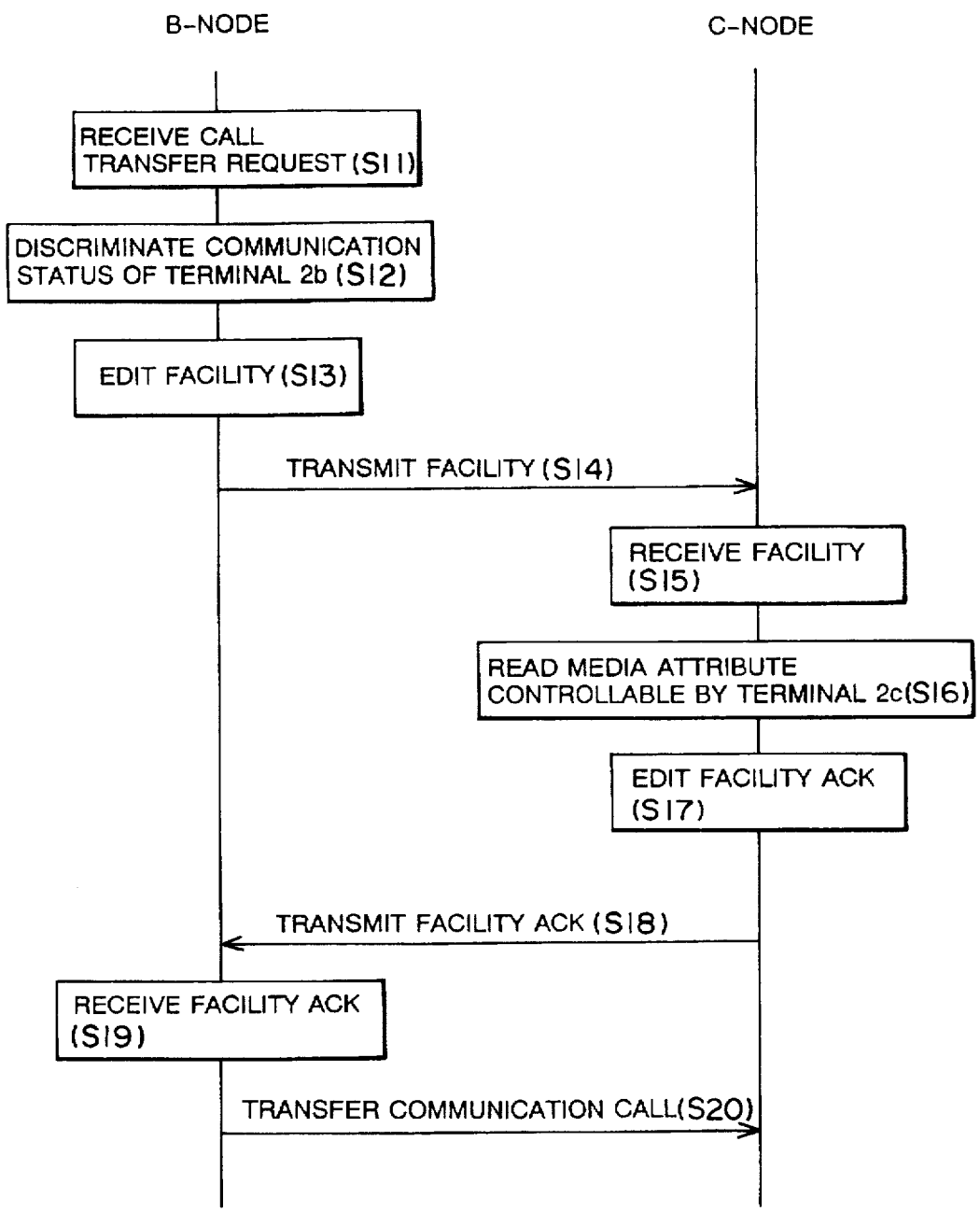
FIG. 22 is a sequence diagram showing processing operations of the A- and B-stations when the terminal 2b of the B-station performing the multi-call communication with the terminal 2a of the A-station makes a call transfer call to a terminal 2c of a C-station.
Figure 23:
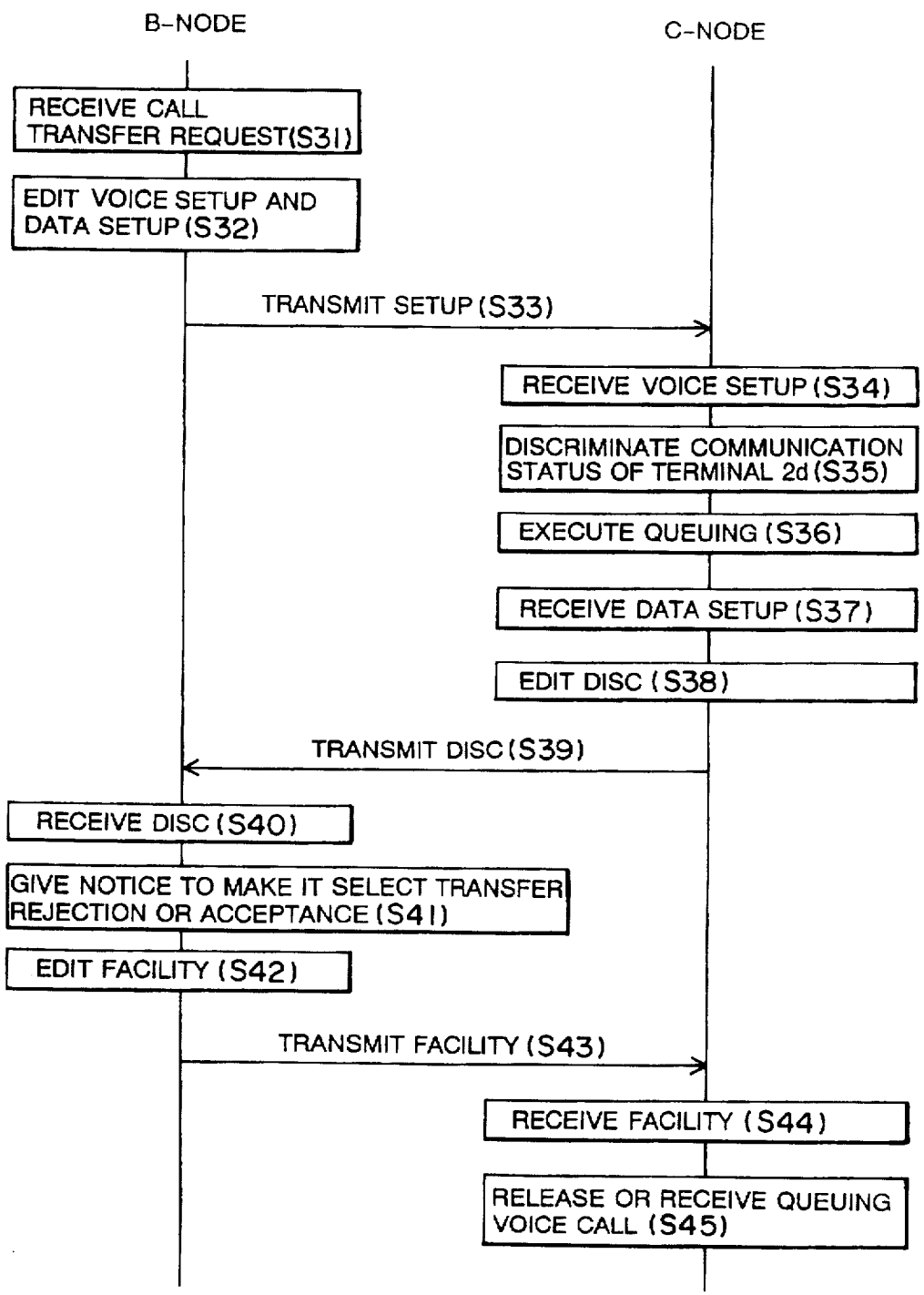
FIG. 23 is a sequence diagram showing the processing operations of the A- and B-nodes when the terminal 2b of the B-node performing the communication with the terminal 2a of the A-node makes the call transfer request to the terminal 2c of the C-node during the communication conducted between the terminal 2d of the terminal 2e of the C-node.

FIG. 22 is a sequence diagram showing processes executed by the A-node 1-1 and the B-node 1-2 when the terminal 2b connected to the B-node 1-2 that performs the multi-call communication with the terminal 2a connected to the A-node 1-1 requests of the call transfer to the terminal 2c connected to the C-node 1-3.

When receiving this call transfer request (step S11), the B-node 1-2 accesses the call data area 6a and thus discriminates a communication status of the terminal 2b (step S12).

In step S12, the identification is made such that the terminal 2b is on the multi-call communication, and hence the B-node 1-2 writes the media attributes (which are herein voices and data) in the multi-call communication used by the terminal 2b to the facilities information element of the FACILITY message. The B-node 1-2 then sets an identification request flag requesting an identification of the media attribute controllable by the terminal 2c (step S13) and transmits the thus edited FACILITY message to the C-node 1-3 (step S14).

The C-node 1-3, when receiving the FACILITY message (step S15), and if the identification request flag is set in the facilities information element of the FACILITY message, reads the media attributes controllable by the terminal 2c from the terminal data area 6b (step S16). Herein, if there are media attributes common between the media attributes written to the facilities information element of the FACILITY message and the media attributes read from the terminal data area 6b, it is possible to perform the transfer in the call communication based on these common media attributes. Herein, the voices and the data are defined as the common media attributes.

The C-node 1-3, if there are the common media attributes, writes the transferrable media attributes (voices and data) to the facilities information element of the FACILITY ACK message (step S17) and also transmits the thus edited FACILITY ACK message to the B-node 1-2 (step S18).

In the B-node 1-2, upon receiving the FACILITY ACK message (step S19), the communication call of the media attributes written to the facilities information element of the FACILITY ACK message are transferred to the C-node 1-3 (step S20).

(3) Transfer processes executed by the A-node 1-1 and the B-node 1-2 when the terminal 2b of the B-node 1-2 that communicates with the terminal 2a of the A-node 1-1 makes a call transfer request to the terminal 2c of the C-node 1-3 during the communication between the terminals 2d and 2e of the C-node 1-3.

FIG. 22 is a sequence diagram showing processes executed by the A-node 1-1 and the B-node 1-2 when the terminal 2b connected to the B-node 1-2 that performs the voice/data multi-call communication with the terminal 2a connected to the A-node makes a request of call transfer to the terminal 2c connected to the C-node 1-3 while the terminal 2d and the terminal 2e that are connected to the C-node 1-3 communicate with each other through a call of data.

When receiving the call transfer request (step S31), the B-node 1-2 sets a multi-call simultaneous identification flag indicating of being a multi-call simultaneous transfer in each of the facilities information elements of a voice SETUP message and a data SETUP message (step S32). The B-node 1-2 transmits each of the thus edited SETUP messages to the C-node 1-3 (step S33).

The C-node 1-3, on receiving the voice SETUP message (step S34), and if the multi-call simultaneous transfer identification flag is set in the facilities information element, reads the call data area 6a and discriminates a communication status of the terminal 2d (step S35).

In case the identification is made such that the terminal 2d is not using the voices in step S35, the C-node 1-3 queues the voice communication call transfer (step S36).

Further, the C-node 1-3, on receiving the data SETUP message (step S37), sets the multi-call simultaneous transfer identification flag in the facilities information element of the DISC message (step S38) and transmits the thus edited DISC message to the B-node 1-2 (step S39).

The B-node 1-2, when receiving the DISC message (step S40), and if the multi-call simultaneous identification flag is set in the facilities information element thereof, gives a notice making it select whether the transfer is rejected or accepted to the terminal 2b (step S41).

The B-node 1-2 sets the identification flag indicating whether the terminal 2b rejects or accepts the transfer in the facilities information element of the FACILITY message (step S42) and transmits the thus edited FACILITY message to the C-node 1-3 (step S43).

The C-node 1-3, upon receiving the FACILITY message (step S44), and if the identification flag indicating the transfer rejection is set in the facilities information element thereof, releases the in-queue voice communication call and, whereas if the identification flag indicating the transfer acceptance is set therein, makes the terminal 2d receive the in-queue voice communication call (step S45).

As discussed above, according to this embodiment, when the terminals capable of simultaneously controlling the plurality of communication calls with different media attributes communicate each other, all the communication calls can be, whether in the node or between the nodes, automatically transferred to other terminal with the single communication procedure, and the media attribute of the communication call to be transferred can be designated beforehand. Accordingly, there is eliminated a necessity for a re-transmission thereof, and it is possible to prevent declines both in the operability of the user and in the system performance, which are caused by a re-acquisition of the communication line. Further, during a talk of the call-transferred party, it is feasible to select whether to transfer only the empty media attribute communication call or to completely reject the transfer. It is therefore possible to flexibly correspond to the using method of the user. Furthermore, the switching processes executed so far can be diverted, and the actualization thereof becomes easier.

As discussed above, according to the first aspect of the present invention, there are provided the first recognizing unit for recognizing which media attribute of the communication call is executed by a call-transferring terminal and the second recognizing unit for recognizing whether or not a call-transferred terminal is capable of controlling the media attributes. Hence, all the communication calls can be automatically transferred with the single transfer procedure.

In this case, if there is provided the selection unit for selecting whether to reject the transfer or to transfer only the not-on-use media attribute communication call when the call-transferred terminal uses a part of the transfer target media, it is possible to make the user capable of selecting whether to transfer only the empty media communication call or to transfer no communication call when the call-transferred terminal is using a part of the transfer target media.

Next, according to the second invention in the multi-call simultaneous transfer system of inter-switchboard, there are provided the first recognizing unit for recognizing which media attribute of the communication cal is executed by a call-transferring terminal and the second recognizing unit for recognizing whether or not the call-transferred terminal is capable of controlling the same media attributes. Hence, all the communication calls can be automatically transferred with the single transfer procedure.

Next, according to the third aspect of the present invention, there are provided the detecting unit for detecting a designation of the media attribute of the communication call to be transferred to the call-transferred terminal which is made by the call-transferring terminal and the transferring unit for transferring the communication calls of designated attributes, thereby making it possible to transfer the communication call of the voluntary media attribute to the counter terminal.

Thus, according to the multi-call simultaneous transfer system of the present invention, first, when the terminals capable of simultaneously controlling the plurality of communication calls with different media attributes perform the simultaneous communication with each other through the plurality of communication call with different media and, one terminal transfers the communication call to other terminal, it is feasible to automatically transfer the communication calls of all the media attributes or transfer only the communication call of the designated media attribute with the signal transfer procedure. Second, if the call-transferred terminal is using a part of the transfer target media attributes, it is possible to make the user select whether to transfer only the empty media attribute communication call or to transfer no communication call of all the media attributes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A multi-call simultaneous transfer system including a plurality of terminals capable of simultaneously controlling communication calls of a plurality of media attributes, wherein each of the communication calls being associated with a different media attribute and a switchboard connected to said terminals, for controlling a simultaneous transfer of communication calls between said terminals, said switchboard comprising:

first recognizing means for recognizing which media attribute of each of the communication calls simultaneously transferred is executed by a call-transferring terminal; and second recognizing means for recognizing whether or not a call-transferred terminal is capable of controlling the media attribute of the communication call executed by said call-transferring terminal.

2. A multi-call simultaneous transfer system according to claim 1, said switchboard further comprising:

transferring means for transferring the communication call executed by said call-transferring terminal to said call-transferred terminal if said second recognizing means recognizes that said call-transferred terminal is capable of controlling the media attribute of the communication call.

3. A multi-call simultaneous transfer system according to claim 2, said switchboard further comprising:

selecting means for making said call-transferring terminal select whether to reject the transfer or to transfer only the communication call with a not-in-use media attribute when said call-transferred terminal uses a number of transfer target media attributes.

4. A multi-call simultaneous transfer system comprising:

a plurality of terminals capable of simultaneously controlling communication calls of a plurality of media attributes, wherein each communication calls being associated with a different media attribute;

a plurality of switchboards controlling a simultaneous transfer of the communication calls between said terminals and supporting an ISDN protocol, wherein each of said switchboards is connected to at least one of said terminals;

first recognizing means for recognizing which media attribute of each of the communication calls is executed by a call-transferring terminal; and second recognizing means for recognizing whether or not a call-transferred terminal is capable of controlling the media attribute of the communication call executed by said call-transferring terminal.

5. A multi-call simultaneous transfer system according to claim 4, wherein said second recognizing means includes:

first storage means, provided in said switchboard connected to said call-transferring terminal, for storing an ISDN layer-3 message transmitted to said switchboard connected to said call-transferred terminal with an effect that said call-transferring terminal performs the communication calls based on the plurality of media attributes;

second storage means, provided in said switchboard connected to said call-transferred terminal, for storing the ISDN layer-3 message responded to said switchboard connected to said call-transferring terminal with the media attributes controllable by said call-transferring terminal; and discriminating means, provided in said switchboard connected to said call-transferring terminal, for discriminating whether or not the media attributes recognized by said first recognizing means are contained in the media attributes with which said second storage means stored the ISDN layer-3 message.

6. A multi-call simultaneous transfer system according to claim 4, further comprising:

first notifying means, provided in said switchboard connected to said call-transferring terminal, for notifying said switchboard connected to said call-transferred terminal of the ISDN layer-3 message written with the media attributes recognized by said first recognizing means; and second notifying means, provided in said switchboard connected to said call-transferred terminal, for notifying said switchboard connected to said call-transferring terminal of the ISDN layer-3 message written with a part of the in-use media attributes when said call-transferred terminal uses a number of the media attributes notified by said first notifying means.

7. A multi-call simultaneous transfer system according to claim 6, further comprising:

selecting means, provided in said switchboard connected to said call-transferring terminal, for making said call-transferring terminal select whether to reject the transfer or to transfer only the communication call of the media attribute that is not being used by said call-transferred terminal when the media attribute used by said call-transferred terminal is written to the ISDN layer-3 message notified by said second notifying means; and control means, provided in said switchboard connected to said call-transferring terminal, for controlling the transfer of the communication cal on the basis of a result selected by said call-transferring terminal in response to said selecting means.

8. A multi-call simultaneous transfer system comprising:

a plurality of terminals capable of simultaneously controlling communication calls of a plurality of media attributes, wherein each communication call being associated with media attribute;

a plurality of switchboards, connected to said terminals, controlling a simultaneous transfer of the communication calls between said terminals and supporting an ISDN protocol wherein each of said switchboards comprising:

detecting means for detecting a designation of the media attribute of each of the communication calls to be transferred to a call-transferred terminal, said designation made by a call-transferring terminal; and transferring means for transferring the communication call of the media attribute designated by the designation which is detected by said detecting means.

9. A switchboard, connected to each of terminals capable of simultaneously controlling communication calls of a plurality of media attributes, for controlling a transfer of the communication calls between said terminals, said switchboard comprising:

first recognizing means for recognizing which media attribute of the communication call is executed by a call-transferring terminal; and second recognizing means for recognizing whether or not a call-transferred terminal is capable of controlling the media attribute of the communication call-performed by said call-transferring terminal.

10. A switchboard, connected to a first terminal having a function capable of simultaneously controlling communication calls of a plurality of media attributes and also connected via other switchboard to a second terminal having the same function, said switchboard comprising:

detecting means for detecting which media attribute of the communication call is to be transferred when transferring the communication call to said first terminal or said second terminal; and transferring means for transferring the communication call of the media attribute detected by said detecting means.

\* \* \* \* \*